United States Patent [19]

Goto

[11] Patent Number: 5,080,462
[45] Date of Patent: Jan. 14, 1992

[54] OPTICAL WAVELENGTH CONVERTER DEVICE AND OPTICAL WAVELENGTH CONVERTER SYSTEM

[75] Inventor: Chiaki Goto, Kanagawa, Japan

[73] Assignee: Fuji Photo Film Co., Ltd., Kanagawa, Japan

[21] Appl. No.: 608,502

[22] Filed: Nov. 2, 1990

[30] Foreign Application Priority Data

| Nov. 2, 1989 | [JP] | Japan | 1-286342 |
| Nov. 2, 1989 | [JP] | Japan | 1-286343 |
| Nov. 14, 1989 | [JP] | Japan | 1-295627 |
| Nov. 14, 1989 | [JP] | Japan | 1-295628 |
| Dec. 6, 1989 | [JP] | Japan | 1-317154 |

[51] Int. Cl.⁵ ............................................. G02F 1/37
[52] U.S. Cl. .................................... 385/122; 385/31; 385/123; 359/328; 359/332
[58] Field of Search .................. 307/425-430; 350/96.15, 96.16, 96.18, 96.19, 96.29, 96.30, 96.34, 96.12

[56] References Cited

U.S. PATENT DOCUMENTS

| 4,830,447 | 5/1989 | Kamiyama et al. | 350/96.12 |
| 4,874,221 | 10/1989 | Ohsawa | 350/96.29 |
| 4,892,375 | 1/1990 | Chikuma et al. | 350/96.18 |
| 4,909,587 | 3/1990 | Okamoto et al. | 350/96.19 |
| 4,923,277 | 5/1990 | Okazaki et al. | 350/96.29 |
| 5,005,938 | 4/1991 | Itoh et al. | 350/96.18 |

FOREIGN PATENT DOCUMENTS 62-210432 9/1987 Japan.
64-79734 3/1989 Japan.

OTHER PUBLICATIONS

"Introduction to Optical Electronics", pp. 200–204, written by A. Yariv, translated by K. Tada and T. Kamiya, published by Maruzen K.K.
Bulletin of the Microoptics Research Group, vol. 3, No. 2, pp. 28–32.

Primary Examiner—John D. Lee
Attorney, Agent, or Firm—Sughrue, Mion, Zinn, Macpeak & Seas

[57] ABSTRACT

An optical wavelength converter device is of the fiber type including a cladding and a core surrounded by the cladding, the cladding having a lower refractive index than the refractive index of the core. The optical wavelength converter device serves to convert a fundamental wave into a secondary harmonic wave. The cladding has an exit end surface shaped for converting the wavefront of a wavelength-converted wave from the conical wavefront into a planar or spherical wavefront. A optical wavelength converter system comprises such an optical wavelength converter device and an optical device for diffractively or refractively converting the wavefront of the wavelength-converted wave from a conical wavefront into a planar or spherical wavefront.

8 Claims, 13 Drawing Sheets

F I G. 27
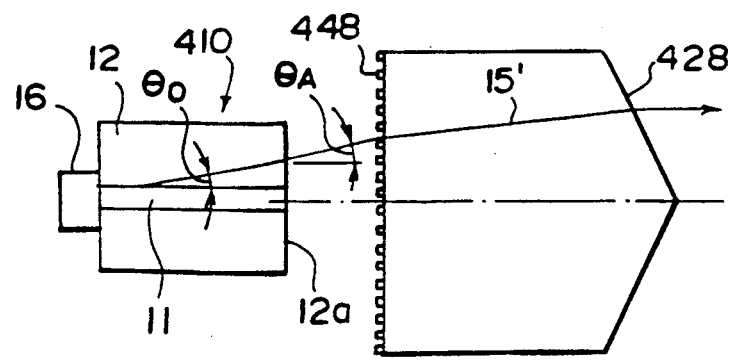
F I G. 28
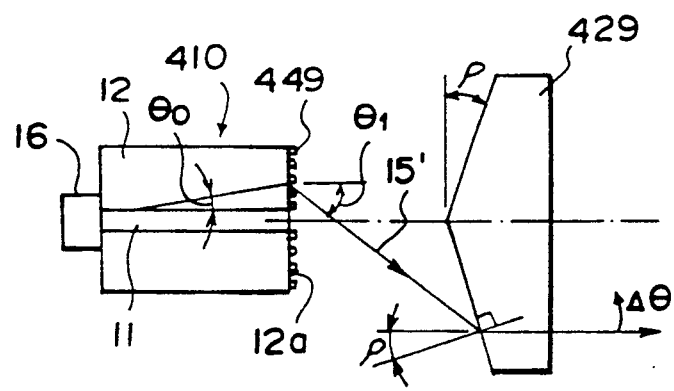
F I G. 29
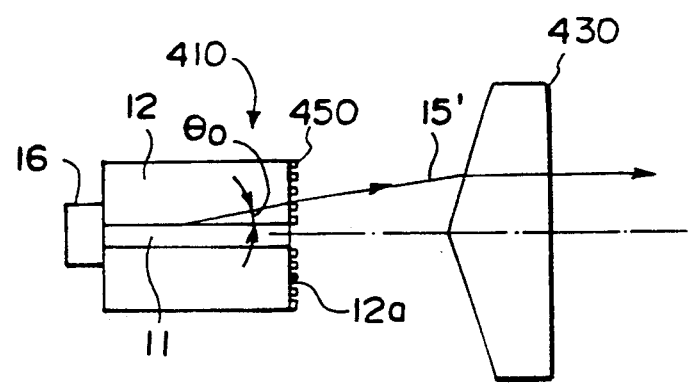

OPTICAL WAVELENGTH CONVERTER DEVICE AND OPTICAL WAVELENGTH CONVERTER SYSTEM

BACKGROUND OF THE INVENTION

1. Field of the Invention

The present invention relates to a fiber type optical wavelength converter device for converting a fundamental wave into a second harmonic wave having a wavelength which is ½ of the wavelength of the fundamental wave, and more particularly to an optical wavelength converter device which is capable of converting the wavefront of a wavelength-converted wave from a conical wavefront into a planar or spherical wavefront. The present invention also relates to an optical wavelength converter system which comprises a fiber-type optical wavelength converter device for converting a fundamental wave into a second harmonic wave whose wavelength is ½ of the wavelength of the fundamental wave, and an optical device for converting the wavefront of a wavelength-converted wave from a conical wavefront into a planar or spherical wavefront.

2. Description of the Prior Art

Various attempts have heretofore been made to convert a wave of laser beam, which has been applied as a fundamental wave to a nonlinear optical material, to its second harmonic or the like (i.e., to shorten the wavelength of the laser beam). One well known example of an optical wavelength converter device for effecting such laser wavelength conversion is a bulk-crystal-type optical wavelength converter device as disclosed, for example, in *Introduction to Optical Electronics*, pages 200-204, written by A. Yariv and translated by Kunio Tada and Takeshi Kamiya (published by Maruzen K.K.). This optical wavelength converter device relies upon the birefringence of a crystal in order to meet phase matching conditions. Therefore, any material which does not exhibit birefringence or exhibits only small birefringence cannot be employed even if it has high nonlinearity.

To solve the above problem, there has been proposed a fiber-type optical wavelength converter device. An optical wavelength converter device of this type is in the form of an optical fiber comprising a core made of a nonlinear optical material and surrounded by a cladding. One example of such an optical fiber is shown in Vol. 3, No. 2, pages 28-32, of the Bulletin of the Microoptics Research Group of a gathering of the Applied Physics Society. Recently, much effort has been directed to the study of a fiber-type optical wavelength converter device since it can easily achieve phase matching between a guided mode, in which a fundamental is guided through the core, and a radiated mode, in which a second harmonic is radiated into the cladding (for so-called Cerenkov radiation).

The wavelength-converted wave produced by the fiber-type optical wavelength converter device is emitted from the output end of the cladding and has various applications. In many of the applications, the wavelength-converted wave is converged into a small spot. For example, the wavelength-converted wave is focused into a very small spot for higher recording density, when the wavelength-converted wave is used to record optical signals optically.

However, it is recognized that the wavelength-converted wave emitted from the fiber Cerenkov-type optical wavelength converter device cannot converge into a small spot even if the emitted wave is passed through a general spherical lens.

SUMMARY OF THE INVENTION

It is an object of the present invention to provide an optical wavelength converter device which can converge a wavelength-converted wave into a small spot, and an optical wavelength converter system, which employs such an optical wavelength converter device.

Another object of the present invention is to provide an optical wavelength converter device which can keep a wavelength-converted wave converged into a small spot even when the wavelength of a laser beam applied as a fundamental wave thereto varies due to a change in the wavelength of the oscillated laser beam, which is emitted from a laser beam source, and an optical wavelength converter system, which employs such an optical wavelength converter device.

An optical wavelength converter device according to the present invention is based on the finding that a wavelength-converted wave (which is light emitted at a predetermined phase matching angle and held in phase with a fundamental wave) radiated into the cladding of a fiber Cerenkov-type optical wavelength converter device has a conical wavefront.

The cladding of the optical wavelength converter device according to the present invention has an end surface configuration for converting the wavefront of the wavelength-converted wave from the conical wavefront into a planar or spherical wavefront.

The material of the cladding and the diameter of a core surrounded by the cladding are selected such that the wavelength dependencies $\partial \theta_0/\partial \lambda$, $\partial n/\partial \lambda$ of a phase matching angle $\theta_0$ and a refractive index n of the cladding with respect to the wavelength-converted wave are related to each other as follows:

$$\frac{\partial \theta_0}{\partial \lambda} \approx \frac{\theta_0}{n(n-1)} \cdot \frac{\partial n}{\partial \lambda}$$

where $\lambda$ is the wavelength of the wavelength-converted wave, and the difference between the left- and right-hand sides of the above equation falls within a range smaller than $\sin^{-1}(\lambda/2Dn)$, where D is the effective diameter of the wavelength-converted wave.

If the wavefront of the wavelength-converted wave is to be converted from a conical wavefront into a planar wavefront, then the end surface of the cladding should be of a conical shape. If the wavefront of the wavelength-converted wave is to be converted from a conical wavefront into a spherical wavefront, then the end surface of the cladding should be a lens surface.

After the wavefront of the wavelength-converted wave is converted into a planar or spherical wavefront, the wavelength-converted wave can be focused into a small spot when it is passed through an ordinary spherical lens.

With the cladding material and the core diameter being selected as described above, when the wavelength of the fundamental wave varies, the phase matching angle and the angle of refraction of the wavelength-converted wave at the end surface of the cladding vary so that they cancel out each other, thereby keeping the wavelength-converted wave focused into a small spot. Now, the above process will be described in detail below.

As shown in FIG. 1 of the accompanying drawings, a fiber Cerenkov-type optical wavelength converter device 3 comprises a core 1 made of a nonlinear optical material and a cladding 2 surrounding the core 1, the cladding 2 having a lower refractive index than the refractive index of the core 1. A fundamental wave 5 guided through the core 1 is converted into a second harmonic wave 5', and the conical wavefront of the second harmonic wave 5' is converted into a planar wavefront by a conical exit end surface 2a of the cladding 2.

It is assumed that the phase matching angle is $\theta_o$, the conical exit end surface 2a of the cladding 2 is inclined at an angle $\delta$ with respect to the end surface of the core 1, the refractive index of the cladding 2 with respect to the second harmonic wave 5' is n, the second harmonic wave 5' is emitted from the cladding exit end surface 2a at an angle $\theta_p$ with respect to a line normal to the cladding exit end surface 2a, and the medium surrounding the optical wavelength converter device 3 is air (which has a refractive index of 1). Since the angle of incidence of the second harmonic wave 5' on the cladding end surface 2a is $\delta - \theta_o$, the following equation is satisfied:

$$n \sin(\delta - \theta_o) = \sin \theta_p.$$

If $\theta_p = \delta$, then the conical wavefront of the second harmonic wave 5' in the cladding 2 is converted into a planar wavefront. Therefore, the above equation becomes:

$$n \sin(\delta - \theta_o) = \sin \delta \quad (1)$$

When the equation (1) is solved for $\delta$, the angle $\delta$ is expressed as follows:

$$\delta = \tan^{-1}\left(\frac{n \sin \theta_o}{n \cos \theta_o - 1}\right) \quad (2)$$

With the angle $\delta$ thus selected, the conical wavefront of the second harmonic wave 5' can be converted into a planar wavefront by the cladding exit end surface 2a.

A change or fluctuation in the wavelength of the second harmonic wave 5' will be discussed below. Positive and negative angles are defined as indicated by the symbols +, − in FIG. 1, and the second harmonic wave 5' has a wavelength $\lambda$. From the equation (1) and the relationship $\theta_p = \delta$, the following equation is satisfied:

$$n \sin(\theta - \theta_o) = \sin \theta_p.$$

If the refractive index n of the cladding 2 with respect to second harmonic wave t' varies by $\Delta n$ and the angle $\theta_p$ varies by $\Delta \theta_p$ due to a fluctuation in the wavelength of the fundamental wave 5, then the following equation is satisfied:

$$(n + \Delta n) \sin(\theta_p - \theta_o) = \sin(\theta_p - \Delta \theta_p).$$

If sin x approximates x, then the angle change $\Delta \theta_p$ is given by:

$$\Delta \theta_p \simeq -\frac{\theta_o}{n-1} \Delta n.$$

Therefore, the wavelength dependency of the angle $\theta_p$ is expressed as follows:

$$\frac{\partial \theta_p}{\partial \lambda} \simeq -\frac{\theta_o}{n-1} \frac{\partial n}{\partial \lambda}.$$

Since $\Delta \theta_p \simeq n \Delta \theta_o$, the wavelength dependency of the phase matching angle $\theta_o$ is given by:

$$\frac{\partial \theta_o}{\partial \lambda} \simeq \frac{1}{n} \frac{\partial \theta_p}{\partial \lambda}.$$

If these wavelength dependencies are equal to each other, i.e., $$\frac{1}{n} \frac{\partial \theta_p}{\partial \lambda} - \frac{\theta_o}{n-1} \frac{\partial n}{\partial \lambda} \simeq 0,$$

and hence $$\frac{\partial \theta_o}{\partial \lambda} \simeq \frac{\theta_o}{n(n-1)} \frac{\partial n}{\partial \lambda}, \quad (3)$$

then the wavefront of the second harmonic wave 5', after having passed through the cladding exit end surface 2a, remains planar.

How much difference or error between the left- and right-hand sides of the equation (3) is allowed in practice will be considered below. The p-p value (peak-to-peak value) $\epsilon$ of the wavefront aberration is given by:

$$\epsilon = (D/2)|\sin \Delta \theta|$$

where D is the effective diameter of the second harmonic wave 5' which has passed through the cladding exit end surface 2a and $\Delta \theta$ is an angular deviation of the wavefront. Generally, a well focused beam spot can be obtained if the value of $\epsilon$ is $\lambda/4$ or less in air (n = 1). Therefore, $(D/2)|\sin \Delta \theta| < \lambda/4$, and hence $$|\Delta \theta| < \sin^{-1}(\lambda/2D) \quad (4)$$

The fundamental wave 5 is emitted from a fundamental wave source which is mostly a semiconductor laser. The semiconductor laser has a longitudinal mode interval which is at least about 2 nm. When mode hopping occurs in the semiconductor laser, the wavelength of the secondary harmonic wave varies or fluctuates by $\Delta \lambda$ that is about 1 nm. Since $$\Delta \theta = \frac{\partial \theta}{\partial \lambda} \Delta \lambda,$$

the following inequality is obtained:

$$\left|\frac{\partial \theta}{\partial \lambda}\right| < \sin^{-1}(\lambda/2D)$$

from the inequality (4) if $\Delta \lambda - 1$. Because the equation (3) is satisfied in the medium whose refractive index is n, $\lambda \rightarrow \lambda/n$. Therefore, the p-p value $\epsilon$ of the wavefront aberration is smaller than $\lambda/4$ if the difference between the left- and right-hand sides of the equation (3) is smaller than $\sin^{-1}(\lambda/2D)$.

In the above description, a semiconductor laser is used as the fundamental wave source, and a second harmonic wave is produced by the optical wavelength converter device. However, if the wavelength of the wavelength-converted wave is allowed to vary or fluctuate by about 1 nm, then the optical wavelength converter device may often be practical in other applications.

According to the present invention, a first optical wavelength converter system comprises a fiber Cerenkov-type optical wavelength converter device of the kind described above and an optical device disposed in a position to receive the wavelength-converted wave emitted from the cladding exit end surface, for diffractively converting the wavefront of the wavelength-converted wave from a conical wavefront into a planar or spherical wavefront.

The material of the cladding and the diameter of a core surrounded by the cladding, of the optical wavelength converter device, are selected such that the wavelength dependency $\partial\theta A/\partial\lambda$ of an angle $\theta A$ at which the wavelength-converted wave is emitted from the cladding exit end surface approximates $\theta A/\lambda$ within an error range smaller than $\sin^{-1}(\lambda/2D)$ where $\lambda$ is the wavelength of the wavelength-converted wave, and D is the effective diameter of the wavelength-converted wave.

The optical device may be a grating device having a grating composed of concentric patterns. The optical device may be either spaced from the cladding exit end surface from which the wavelength-converted wave is emitted, fixed in intimate contact with the cladding exit end surface, or formed directly on the cladding exit end surface.

After the wavefront of the wavelength-converted wave is converted into a planar or spherical wavefront by the optical device, the wavelength-converted wave can be focused into a small spot when it is passed through an ordinary spherical lens.

With the cladding material and the core diameter being selected as described above, when the wavelength of the fundamental wave varies, the angle at which the wavelength-converted wave is emitted from the cladding exit end surface and the angle at which the wavelength-converted wave is diffracted by the optical device vary so that they cancel out each other, thereby keeping the wavelength-converted wave focused into a small spot. Now, the above process will be described in detail below.

As shown in FIG. 5, a fiber Cerenkov-type optical wavelength converter device 3 comprises a core 1 made of a nonlinear optical material and a cladding 2 surrounding the core 1, the cladding 2 having a lower refractive index than the refractive index of the core 1. A fundamental wave 5 guided through the core 1 is converted into a second harmonic wave 5', and the conical wavefront of the second harmonic wave 5' is converted into a planar wavefront by a grating device 106 having a grating composed of equally spaced concentric patterns.

The direction of a light beam emitted from the grating device 106 is defined by an angle $\theta OUT$ with respect to the axis of the optical fiber of the optical wavelength converter device (i.e., the optical axis thereof). The angle $\theta OUT$ is positive if the light beam is directed away from the optical axis (i.e., in the direction to produce a divergent conical wavefront), and negative if the light beam is directed toward the optical axis (i.e., in the direction to produce a convergent conical wavefront), as shown in FIG. 5. If $$\theta OUT = \theta A - \theta D = 0,$$

where $\theta D$ is the angle at which the wavelength-converted wave is diffracted by the grating device 106, then the wavefront of the wavelength-converted wave is converted into a planar wavefront. The wavelength dependency of the angle $\theta OUT$ is given by:

$$\frac{\partial \theta OUT}{\partial \lambda} = \frac{\partial \theta A}{\partial \lambda} - \frac{\partial \theta D}{\partial \lambda}.$$

The first term of the right-hand side of the above equation indicates the degree by which the angle $\theta A$ varies depending on a change in the phase matching angle $\theta o$ as the wavelength varies, and the second term indicates the degree by which the angle $\theta D$ varies as the wavelength varies.

Generally, the equation $\sin \theta D = \lambda/\Lambda$ is satisfied where $\Lambda$ is the grating pitch and $\lambda$ is the wavelength of the light beam. Approximately, the angle $\theta D$ is expressed by $\theta D \simeq \lambda/\Lambda$. The wavelength dependency of the angle $\theta D$ is given as:

$$\frac{\Delta \theta D}{\Delta \lambda} \approx \frac{\Delta \theta D}{\partial \lambda} \simeq \frac{1}{\Lambda} \simeq \frac{\theta D}{\lambda}$$

from the equation $(\theta D + \Delta\theta D) \simeq (\lambda + \Delta\lambda)/\Lambda$. To convert the wavefront of the wavelength-converted wave into a planar wavefront, since $\theta D = \theta A$, the wavelength dependency of $\theta OUT$ is expressed by:

$$\frac{\partial \theta OUT}{\partial \lambda} = \frac{\partial \theta A}{\partial \lambda} - \frac{\theta A}{\lambda}.$$

If the equation:

$$\frac{\partial \theta A}{\partial \lambda} \simeq \frac{1}{\lambda} \theta A \tag{101}$$

based on the above equation is satisfied, then the wavefront of the second harmonic wave 5', after having passed through the grating device 106, remains planar.

How much difference or error between the left- and right-hand sides of the equation (101) is allowed in practice will be considered below. The p-p value (peak-to-peak value) $\epsilon$ of the wavefront aberration is given by:

$$\epsilon = (D/2)|\sin \Delta\theta|$$

where D is the effective diameter of the second harmonic wave 5' which has passed through the grating device 106 and $\Delta\theta$ is an angular deviation of the wavefront. Generally, as described above, a well focused beam spot can be obtained if value of $\epsilon$ is $\lambda/4$ or less. Therefore, $(D/2)|\sin \Delta\theta| < \lambda/4$, and hence $$|\Delta\theta| < \sin^{-1}(\lambda/2D) \tag{102}$$

The fundamental wave 5 is emitted from a fundamental wave source which is mostly a semiconductor laser. The semiconductor laser has a longitudinal mode interval which is at least about 2 nm. When mode hopping occurs in the semiconductor laser, the wavelength of the secondary harmonic wave varies or fluctuates by $\Delta\lambda$ that is about 1 nm. Since $$\Delta\theta = \frac{\partial\theta}{\partial\lambda}\Delta\lambda,$$

the following inequality is obtained:

$$\left|\frac{\partial\theta}{\partial\lambda}\right| < \sin^{-1}(\lambda/2D)$$

from the inequality (102) if $\Delta\lambda = 1$ (nm). Therefore, the p-p value $\epsilon$ of the wavefront aberration is smaller than $\Delta/4$ if the difference between the left- and right-hand sides of the equation (101) is smaller than $\sin^{-1}(\lambda/2D)$.

According to the present invention, a second optical wavelength converter system comprises a fiber Cerenkov-type optical wavelength converter device of the kind described above and an optical device disposed in a position to receive the wavelength-converted wave emitted from the cladding exit end surface, for refractively converting the wavefront of the wavelength-converted wave from a conical wavefront into a planar or spherical wavefront.

The material of the cladding and the diameter of a core surrounded by the cladding, of the optical wavelength converter device, are selected such that the wavelength dependency $\partial\theta A/\partial\lambda$ of an angle $\theta A$ at which the wavelength-converted wave is emitted from the cladding exit end surface, i.e., a variation in the angle $\theta A(°)$ at the time the wavelength of the wavelength-converted wave varies by 1 nm, falls in the range:

$$-20 \times 10^{-4}\theta A < \frac{\partial\theta A}{\partial\lambda} < -1.2 \times 10^{-4}\theta A$$

where $\lambda$ is the wavelength of the wavelength-converted wave.

The optical device may be a lens having a conical entrance surface and/or a conical exit surface. The optical device may be either spaced from the cladding exit end surface from which the wavelength-converted wave is emitted, or fixed in intimate contact with the cladding exit end surface.

After the wavefront of the wavelength-converted wave is converted into a planar or spherical wavefront by the optical device, the wavelength-converted wave can be focused into a small spot when it is passed through an ordinary spherical lens.

With the cladding material and the core diameter being selected as described above, when the wavelength of the fundamental wave varies, the angle at which the wavelength-converted wave is emitted from the cladding exit end surface and the angel at which the wavelength-converted wave is refracted by the optical device vary so that they cancel out each other, thereby keeping the wavelength-converted wave focused into a small spot. The above process will be described in detail below.

As shown in FIG. 10, a fiber Cerenkov-type optical wavelength converter device 3 comprises a core 1 made of a nonlinear optical material and a cladding 2 surrounding the core 1, the cladding 2 having a lower refractive index than the refractive index of the core 1. A fundamental wave 5 guided through the core 1 is converted into a second harmonic wave 5', and the conical wavefront of the second harmonic wave 5' is converted into a planar wavefront by a conical lens 206.

The lens 206 has a conical surface 206a facing the optical wavelength converter device 3, and a flat opposite surface 206b facing away from the optical wavelength converter device 3. It is assumed that the cladding 2 has a refractive index n with respect to the second harmonic wave 5', the medium surrounding the optical wavelength converter device 3 is air (which has a refractive index of 1), the material of the lens 206 has a refractive index nL, the phase matching angle is $\theta 0$, the second harmonic 5' is emitted from the exit end surface 2a of the cladding 2 at an angle $\theta A$, the second harmonic wave 5' is incident on the conical entrance surface 206a of the lens 206 at an angle $\theta 2$, and the second harmonic wave 5' is refracted through an angle $\theta 3$ by the lens 206. The following equations are satisfied:

$$n \sin \theta o = \sin \theta A$$

$$\sin \theta 2 = nL \sin \theta 3$$

$$\theta 2 = \theta A + \rho$$

where $\rho$ is the angle at which the conical entrance surface 206a of the lens 206 is inclined with respect to the flat surface 206a thereof. If the second harmonic wave 5' having passed through the lens 206 is a parallel beam, then $\theta 3$ is equal to $\rho$. Therefore, the following equations are satisfied:

$$n \sin \theta o = \sin \theta A \quad (201)$$

$$\sin (\theta A + \rho) = nL \sin \rho \quad (202)$$

Thus, the second harmonic wave 5', after having passed through the lens 206, has a planar wavefront if the angle $\rho$ at which the conical entrance surface 206a of the lens 206 is selected to satisfy the equations (201) and (202).

A change or fluctuation in the wavelength of the second harmonic wave 5' will be discussed below. Positive and negative angles are defined as indicated by the symbols +, − in FIG. 10. A variation $\Delta\theta p$ in the angle at which the second harmonic wave 5' is emitted from the lens 206, at the time the refractive index nL of the lens 206 varies, is approximately given as follows:

$$\Delta\theta p = -\theta A \frac{1}{nL - 1} \frac{\partial nL}{\partial\lambda}\Delta\lambda. \quad (203)$$

The second harmonic wave 5' is generated mostly for the purpose of obtaining a laser beam in the blue spectrum range. The value of $\{1/(nL-1)\}(\partial nL/\partial\lambda)$ is checked for a wavelength region in the vicinity of $\lambda = 400$ nm with respect to actually existing lens materials such as optical glass materials. It is found that the values with respect to the checked lens materials are present in the range of $-(1.2 \sim 20) \times 10^{-4}$ [nm$^{-1}$]. Therefore, the wavelength dependency of the angle $\theta p$ is approximately in the range of:

$$1.2 \times 10^{-4}\theta A < \frac{\partial\theta p}{\partial\lambda} < 20 \times 10^{-4}\theta A.$$

Stated conversely, if the wavelength dependency of the angle $\theta A$ at which the second harmonic wave is emitted from the cladding 2 falls in the range of:

$$-20 \times 10^{-4} \theta A < \frac{\partial \theta A}{\partial \lambda} < -1.2 \times 10^{-4} \theta A.$$

then it is practically possibly to compensate for the wavelength dependency of the angle $\theta p$, at which the second harmonic wave is emitted from the conical lens 206, with the wavelength dependency of the angle $\theta A$, at which the second harmonic wave 5' is emitted from the cladding 2.

According to the present invention, a third optical wavelength converter system comprises a fiber Cerenkov-type optical wavelength converter device of the kind described above and a reflective optical device for converting the wavefront of the wavelength-converted wave from a conical wavefront into a planar wavefront, the reflective optical device having a central axis aligned with the center of the core of the optical wavelength converter device, the reflective optical device also having a first conical reflecting surface for reflecting the wavelength-converted wave emitted from the cladding device, toward the central axis, and a second conical reflecting surface for reflecting the wavelength-converted wave, which has been reflected by the first reflecting surface, in a direction away from the optical wavelength converter device.

According to the present invention, a fourth optical wavelength converter system comprises a fiber Cerenkov-type optical wavelength converter device of the kind described above and a reflective optical device for converting the wavefront of the wavelength-converted wave from a conical wavefront into a planar wavefront, the reflective optical device having a central axis aligned with the center of the core of the optical wavelength converter device, the reflective optical device also having a first substantially conical reflecting surface for reflecting the wavelength-converted wave emitted from the cladding exit end surface of the optical wavelength converter device, toward the central axis, and a second substantially conical reflecting surface for reflecting the wavelength-converted wave, which has been reflected by the first reflecting surface, in a direction away from the optical wavelength converter device, at least one of the reflecting surfaces having a curvature.

In the third or fourth optical wavelength converter device, more preferably the material of the cladding and the diameter of a core surrounded by the cladding, of the optical wavelength converter device, are selected such that the absolute value $|\partial \theta A/\partial \lambda|$ of the wavelength dependency of the angle $\theta A$ at which the wavelength-converted wave is emitted from the cladding exit end surface is smaller than $\sin^{-1}(\lambda/2D)$ where $\lambda$ is the wavelength of the wavelength-converted wave, and D is the effective diameter of the wavelength-converted wave.

After the wavefront of the wavelength-converted wave is converted into a planar or spherical wavefront by the reflective optical device, the wavelength-converted wave can be focused into a small spot when it is passed through an ordinary spherical lens.

According to the present invention, a fifth optical wavelength converter system comprises a fiber Cerenkov-type optical wavelength converter device of the kind described above and refractive and diffractive optical devices positioned to receive the wavelength-converted wave emitted from the cladding exit end surface of the optical wavelength converter device, for respectively refracting and diffracting the wavelength-converted wave to convert the conical wavefront thereof refractively and diffractively into a planar or spherical wavefront, the optical devices being separate from the optical wavelength converter device, and arranged to satisfy the equation:

$$\frac{\partial \theta A}{\partial \lambda} + \frac{\partial \theta t}{\partial \lambda} = 0 \qquad (401)$$

where $\partial \theta t/\partial \lambda$ is the wavelength dependency of the total angle $\theta t$ at which the wavelength-converted wave is deflected by the optical devices, and $\partial \theta A/\partial \lambda$ is the wavelength dependency of the angel $\theta A$ at which the wavelength-converted wave is emitted from the cladding end surface.

According to the present invention, a sixth optical wavelength converter system comprises a fiber Cerenkov-type optical wavelength converter device of the kind described above and refractive and diffractive optical devices positioned to receive the wavelength-converted wave emitted from the cladding exit end surface of the optical wavelength converter device, for respectively refracting and diffracting the wavelength-converted wave to convert the conical wavefront thereof refractively and diffractively into a planar or spherical wavefront, one of the optical devices being formed directly on the cladding exit end surface, and arranged to satisfy the equation:

$$n\frac{\partial \theta o}{\partial \lambda} + \frac{\partial \theta t}{\partial \lambda} = 0 \qquad (402)$$

where $\partial \theta t/\partial \lambda$ is the wavelength dependency of the total angle $\theta t$ at which the wavelength-converted wave is deflected by the optical devices, n is the refractive index of the cladding, $\theta o$ is the phase matching angle, and $\partial \theta o/\partial \lambda$ is the wavelength dependency of the phase matching angle $\theta o$.

The refractive optical device may be a lens having a conical entrance surface and/or a conical exit surface. The diffractive optical device may be a grating device having a grating composed of concentric patterns.

After the wavefront of the wavelength-converted wave is converted into a planar or spherical wavefront by the optical devices, the wavelength-converted wave can be focused into a small spot when it is passed through an ordinary spherical lens.

With the equation (402) being satisfied in the fifth optical wavelength converter device, when the wavelength of the wavelength-converted wave varies due to a variation in the wavelength of the fundamental wave, the angle at which the wavelength-converted wave is emitted from the cladding exit end surface and the angle at which the wavelength-converted wave is emitted from the second optical device (i.e., the optical device remote from the optical wavelength converter device) vary so that they cancel out each other, thereby keeping the wavelength-converted wave focused into a small spot.

With the equation (402) being satisfied in the sixth optical wavelength converter device, when the wavelength of the wavelength-converted wave varies due to a variation in the wavelength of the fundamental wave, the phase matching angle, i.e., the angle at which the wavelength-converted wave is applied to the optical device on the cladding exit end surface, and the angle at which the wavelength-converted wave is emitted from the second optical device vary so that they cancel out each other, thereby keeping the wavelength-converted wave focused into a small spot.

In the fifth and sixth optical wavelength converter devices, the wavelength dependency of the angle at which the wavelength-converted wave is emitted from the second optical device, or the phase matching angle is compensated for by the combination of the refractive and diffractive optical devices. Therefore, the wavelength dependency compensation can be achieved for a wide variety of optical wavelength converter devices whose wavelength dependencies range from a very small value to a very large value.

Since the wavelength of the fundamental wave is allowed to vary according to the present invention, the wavelengths of laser beams oscillated by laser beam sources may differ from each other. Consequently, the yield of optical wavelength converter devices is increased, and any broken-down laser beam source can easily be replaced without replacement of the associated optical wavelength converter device.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 21, 22, 23, 24, 25, 26, 27, 28, 29, 30, and 31 are side elevational views of optical wavelength converter systems according to seventh, eighth, ninth, tenth, eleventh, twelfth, thirteenth, fourteenth, fifteenth, sixteenth, and seventeenth embodiments, respectively, of the present invention.

DESCRIPTION OF THE PREFERRED EMBODIMENTS

Figure 1:
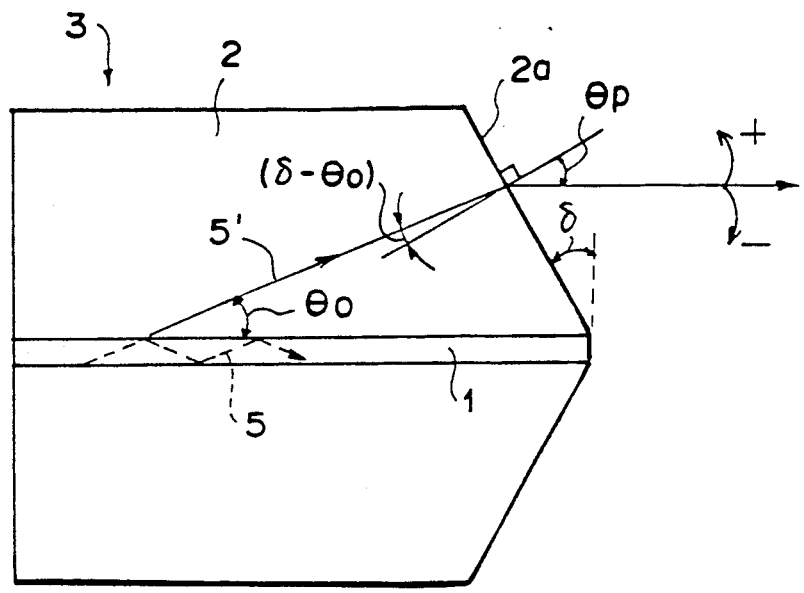
FIG. 1 is a side elevational view illustrative of the fundamental arrangement of an optical wavelength converter device according to the present invention.
Figure 2:
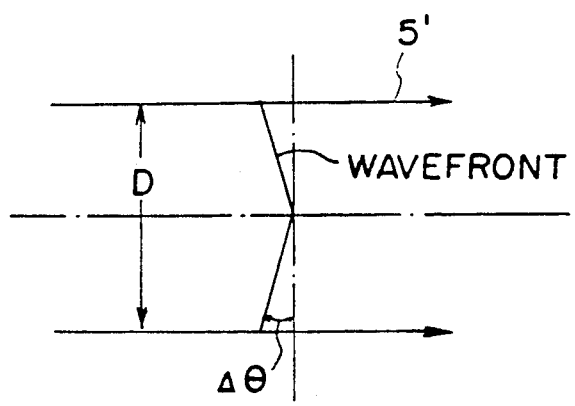
FIG. 2 is a schematic view illustrative of wavefront aberration.

Like or corresponding parts are denoted by like or corresponding reference numerals through views.

Figure 3:
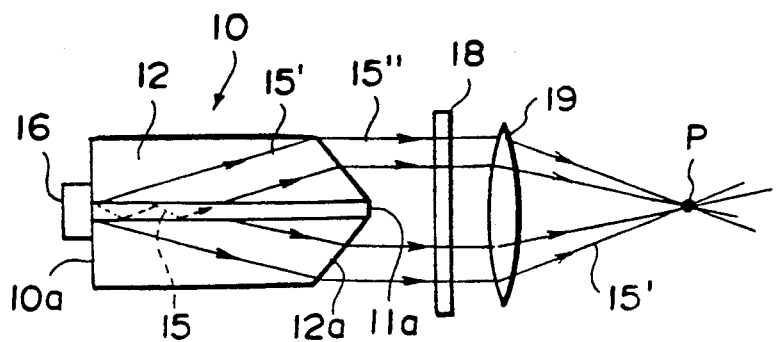
FIG. 3 is a side elevational view of an optical wavelength converter device according to a first embodiment of the present invention.

FIG. 3 shows an optical wavelength converter device 10 according to a first embodiment of the present invention. The optical wavelength converter device 10 comprises an optical fiber including a core 11, which is made of a nonlinear optical material and filled in a hollow space defined centrally in a cladding 12. The nonlinear optical material of the core 11 is preferably an organic nonlinear optical material having a high wavelength conversion efficiency. In this embodiment, the core 11 is made of 3,5-dimethyl-1-(4-nitrophenyl)-pyrazole (hereinafter referred to as "PRA"), as disclosed in Japanese Unexamined Patent Publication No. 62(1987)-210432. The cladding 12 is made of LaK10 glass.

The optical wavelength converter device 10 is manufactured as follows: A hollow fiber of LaK10 glass, which will serve as the cladding 12, is provided, the hollow glass fiber having an outside diameter of about 3 mm and the hollow space therein having a diameter of about 0.8 µm, for example. PRA in a molten state is filled in the hollow space in the glass fiber, and solidified into a single crystal. Then, the opposite ends of the glass fiber are cut off and ground, thereby producing the optical wavelength converter device 10. The above process of manufacturing the optical wavelength converter device 10 is disclosed in detail in Japanese Unexamined Patent Publication No. 64(1989)-79734, for example.

One of the ends of the optical wavelength converter device 10 is obliquely cut at an angle δ with respect to the end surface of the core 1, providing a conical surface which will serve as a cladding exit end surface 12a.

The optical wavelength converter device 10 is used as shown in FIG. 3. A semiconductor laser 16, capable of emitting a laser beam 15 having a wavelength of 870 nm, for example, is employed as a fundamental wave generating means. The semiconductor layer 16 is directly fixed to an entrance end surface 10a of the optical wavelength converter device 10. The laser beam (fundamental wave) 15 emitted from the semiconductor laser 16 enters the core 11, and is converted into a second harmonic wave 15', which has a wavelength that is ½ of the wavelength of the fundamental wave 15, by the PRA of the core 11. The second harmonic wave 15' is radiated into the cladding 12 and travels through the device 10 toward the exit end thereof. Phase matching is achieved between a guided mode, in which the fundamental wave 15 is guided through the core 11, and a radiated mode, in which the second harmonic 15' is radiated into the cladding 12 (Cerenkov radiation).

The second harmonic wave 15' is emitted out of the device 10 from the exit end surface 12a of the cladding 12. The fundamental wave 15 which has been guided through the core 11 is emitted from the exit end surface 11a of the core 11. A light beam 15'', which contains the second harmonic wave 15' and the fundamental wave 15, then goes through a filter 18 which passes only the second harmonic wave 15'. Therefore, only the second harmonic wave 15' is extracted by the filter 18. The second harmonic wave 15' then passes through a condenser lens 19 in the form of a general spherical lens by which it is converged into a small beam spot P. FIG. 3 does not show any device which utilizes the second harmonic wave 15'. However, such a device usually utilizes the focused spot of the second harmonic wave 15'.

Figure 4:
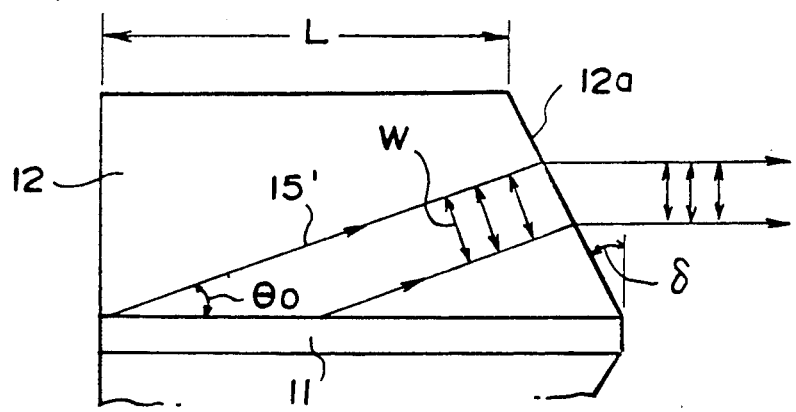
FIG. 4 is an enlarged fragmentary side elevational view of the optical wavelength converter device shown in FIG. 3.

Operation of the conically shaped exit end surface 12a of the cladding 12 will hereinafter be described in detail. In this embodiment, as shown in FIG. 4, the cladding 12 is thick enough for the second harmonic wave 15' radiated into the cladding 12 at a phase matching angle θo to be emitted out of the device 10 directly from the cladding exit end surface 12a without being totally reflected by the outer surface of the cladding 12. To achieve this, the diameter Dc of the cladding 12 should be selected to meet the condition:

$$Dc > 2L \cdot \tan\theta o - d$$

where d is the diameter of the core 11 and L is the length of the outer peripheral surface of the cladding 12. With such dimensional limitations, the wavefront of the second harmonic wave 15' traveling through the cladding 12 is oriented as indicated by the arrows W in FIG. 4 in one plane including the core axis. Therefore, the wavefront is of a conical shape as a whole.

If the angle δ at which the cladding exit end surface 12a is inclined is defined according to the equation (2) above, the conical wavefront of the second harmonic wave 15' is converted into a planar wavefront. In this embodiment, the refractive index n of the cladding 12 is n = 1.73799 and the phase matching angle θo is θo = 9.01°, and hence the angle δ is δ = 20.80°. After the wavefront of the second harmonic wave 15' has been thus converted, the second harmonic wave 15' can be focused into a small spot P when it is passed through the condenser lens 19.

An effect of variations or fluctuations in the wavelength of the fundamental wave 15 or the second harmonic wave 15' will be considered below. If the core 11 of PRA has a diameter of 0.8 μm, the cladding 12 of LaK10 glass has a diameter of 3 mm, the phase matching angle θo is θo = 9.01°, and the second harmonic wave 15' is emitted from the cladding exit end surface 12a at an angle θp = δ = 20.80°, then the wavelength dependency of the phase matching angle θo is expressed by:

$$\frac{\partial \theta o}{\partial \lambda} = -0.00070°/nm$$

The sign of the angle is defined above with respect to FIG. 1.

Since the wavelength of the fundamental wave is 870 nm, the wavelength λ of the second harmonic wave is λ = 435 nm. The refractive index n of LaK10 glass and the wavelength dependency of the refractive index n thereof are as follows:

$$n = 1.73799, \quad \frac{\partial n}{\partial \lambda} = -0.00019.$$

Therefore, the refractive index characteristic of LaK10 glass is expressed as follows:

$$\frac{\theta o}{n(n-1)} \quad \frac{\partial n}{\partial \lambda} = -0.00132°/nm$$

From the above numerical values, the difference between the left- and right hand sides of the equation (3) becomes:

$$-00070 - (-00132) = 0.00062°/nm.$$

The value of $\sin^{-1}(\lambda/2Dn)$ is:

$$\sin^{-1}(0.435/2 \times 3000 \times 0.73799) = 0.00239°/nm.$$

Since
0.00062°/nm < 0.00239°/nm,
the p-p value ε of the wavefront aberration remains smaller than λ/4 for the reasons described above even when the wavelength λ of the second harmonic wave 15' varies by about 1 nm.

Figure 7:
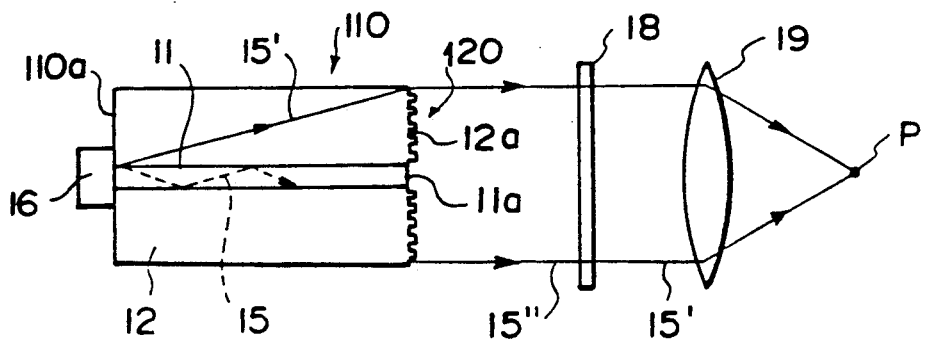
FIG. 7 is a side elevational view of an optical wavelength converter system according to a second embodiment of the present invention.

FIG. 7 shows an optical wavelength converter system according to a second embodiment of the present invention. The optical wavelength converter system shown in FIG. 7 includes an optical wavelength converter device 110 which is basically the same as the optical wavelength converter device 10 shown in FIG. 3 except for the cladding exit end surface at the right-hand end in FIG. 7.

Figure 8:
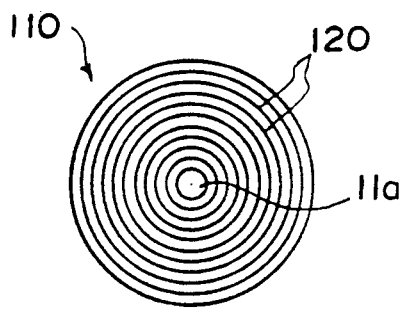
FIG. 8 is a front elevational view of a grating composed of equally spaced concentric patterns in the system shown in FIG. 7.

A grating 120 composed of equally spaced concentric patterns is formed on the cladding exit end surface 12a of the optical wavelength converter device 110. The grating 120 is shown in front elevation in FIG. 8. The grating 120 may be fabricated by the known photolithographic process.

The optical wavelength converter device 110 is used as shown in FIG. 7. A laser beam (fundamental wave) 15, which is emitted from the semiconductor laser 16 directly fixed to an entrance end surface 110a of the device 110, enters the core 11, and phase matching is achieved, in the same manner as with the first embodiment.

Figure 9:
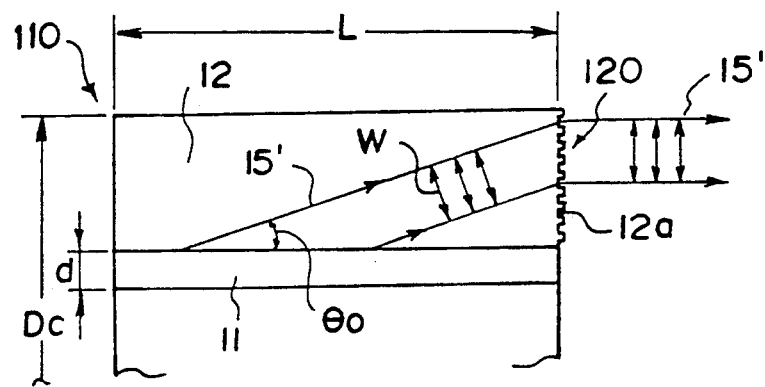
FIG. 9 is an enlarged fragmentary side elevational view of an optical wavelength converter device in the system shown in FIG. 7.

The grating 120 operates as follows: As shown in FIG. 9, the cladding 12 is thick enough for the second harmonic wave 15' radiated into the cladding 12 at a phase matching angle θo to be emitted out of the device 10 directly from the cladding exit end surface 12a without being totally reflected by the outer surface of the cladding 12. The grating 120 has a grating pitch Λ A is defined according to the equation:

$$\sin \theta A = \lambda/\Lambda \qquad (103)$$

where $\lambda$ is the wavelength of the second harmonic wave 15' and $\theta A$ is the angle at which the second harmonic wave 15' is emitted from the cladding exit end surface 12a. The conical wavefront of the second harmonic wave 15' is converted into a planar wavefront when it passes through the grating 120. After having passed through the grating 120, the second harmonic wave 15' can be focused into a small spot P when it passes through the condenser lens 19 which is a general spherical lens.

An effect of variations or fluctuations in the wavelength of the fundamental wave 15 or the second harmonic wave 15' will be considered below. The angle $\theta A$, the phase matching angle $\theta o$, and the refractive index nc of the cladding 12 with respect to the second harmonic wave 15' are related as follows:

$$\sin \theta A = nc \sin \theta 0.$$

Therefore, the equation (103) is modified into:

$$\Lambda = \lambda/(nc \sin \theta 0) \qquad (104)$$

If the diameter of the core 11 of PRA is 1.1 μm and the diameter of the cladding 12 of LaK10 glass is 3 mm, then we get:

$$\theta o = 5.967°, \quad \theta A = 10.409°$$

$$\frac{\partial \theta o}{\partial \lambda} = +0.0150°/nm$$

$$\frac{\partial \theta A}{\partial \lambda} = +0.0252°/nm.$$

Figure 5:
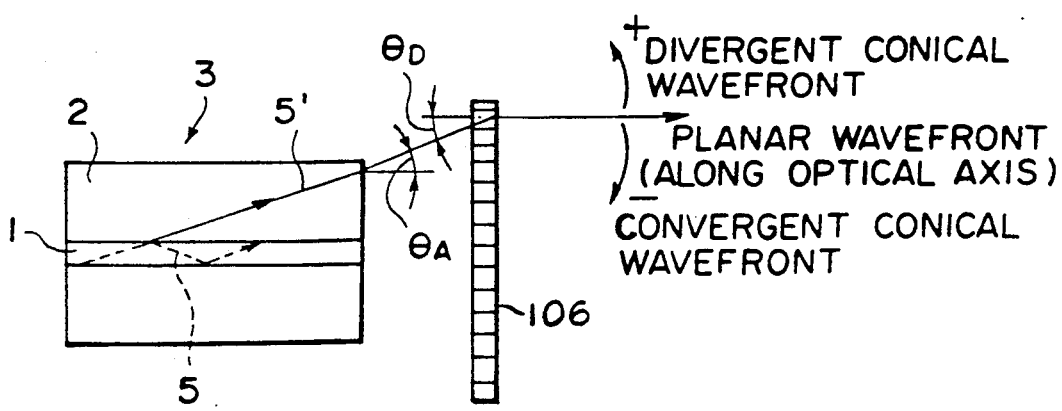
FIG. 5 is a side elevational view illustrative of the fundamental arrangement of a first optical wavelength converter system according to the present invention.
Figure 6:
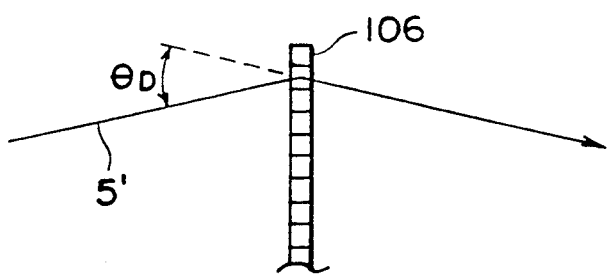
FIG. 6 is a view illustrative of the manner in which a wavelength-converted wave is diffracted by an optical device for wavefront conversion.

The sign of the angle is defined above with respect to FIG. 5.

Since the wavelength of the fundamental wave is 870 nm, the wavelength $\lambda$ of the second harmonic wave is $\lambda = 435$ nm. The refractive index nc of LaK10 glass with respect to the wavelength $\lambda$ is 1.73799. When nc = 1.73799 and $\theta o = 5.967°$ are substituted in the equation (104), the grating pitch $\Lambda$ becomes $\Lambda = 2.408$ μm.

The wavelength dependency of the angle $\theta D$ at which the second harmonic wave 15' is diffracted by the grating 120, which wavelength dependency is expressed by:

$$\frac{\partial \theta D}{\partial \lambda} \approx \frac{1}{\lambda} \theta A.$$

becomes:

$$\frac{\partial \theta D}{\partial \lambda} \approx +0.0239°/nm$$

since $\lambda = 435$ nm and $\theta A = 10.409°$. As described above, the wavelength dependency of the angle $\theta A$ is given as:

$$\frac{\partial \theta A}{\partial \lambda} = +0.252°/nm.$$

The difference between these wavelength dependencies is therefore 0.0013°/nm. This numerical value is smaller than the value of:

$$\sin^{-1}(\lambda/2D) = 0.0042°/nm,$$

i.e., 0.0013°/nm < 0.0042°/nm. Therefore, the p-p value $\epsilon$ of the wavefront aberration remains smaller than $\lambda/4$ for the reasons described above even when the wavelength $\lambda$ of the second harmonic wave 15' varies by about 1 nm.

In the above embodiment, the grating 120 is directly formed on the cladding exit end surface 12a. However, an optical device for effecting wavelength conversion may be disposed separately from the fiber Cerenkov-type optical wavelength converter device, as shown in FIG. 5.

Figure 11:
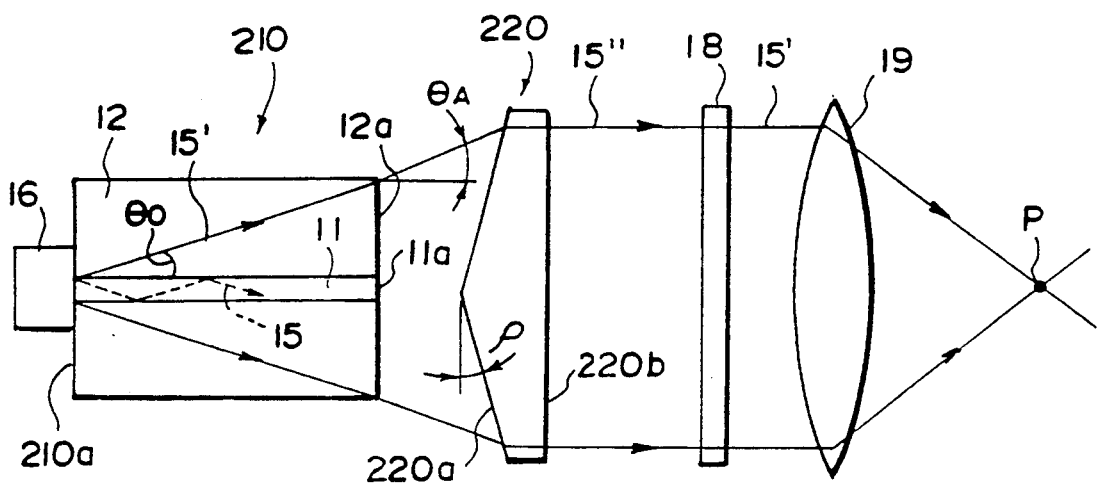
FIG. 11 is a side elevational view of an optical wavelength converter system according to a third embodiment of the present invention.

FIG. 11 shows an optical wavelength converter system according to a third embodiment of the present invention. The optical wavelength converter system shown in FIG. 11 includes an optical wavelength converter device 210 and a conical lens 220 serving as an optical device for effecting wavefront conversion. The optical wavelength converter device 210 is basically the same as the optical wavelength converter device 110 shown in FIG. 7 except for the cladding exit end surface at the right-hand end in FIG. 11.

The conical lens 220 is made of SFS3 glass and has a conical surface 220a facing the optical wavelength converter device 210 and a flat surface 220b opposite to the conical surface 220a.

A laser beam (fundamental wave) 15, which is emitted from the semiconductor laser 16 directly fixed to an entrance end surface 210a of the device 210, enters the core 11. The fundamental wave 15 is converted into a second harmonic wave 15', whose wavelength is ½ of the wavelength of the fundamental wave 15, by the PRA of the core 11.

Figure 12:
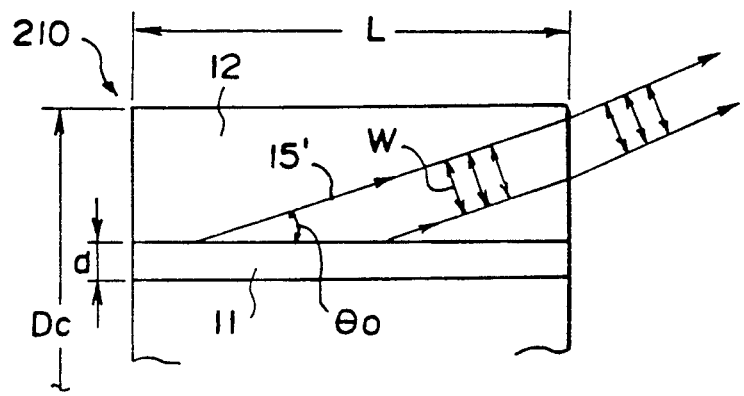
FIG. 12 is an enlarged fragmentary side elevational view of an optical wavelength converter device in the system shown in FIG. 11.

Operation of the conical lens 220 will be described in detail below. As shown in FIG. 12, the cladding 12 is thick enough for the second harmonic wave 15' radiated into the cladding 12 at a phase matching angle $\theta o$ to be emitted out of the device 10 directly from the cladding exit end surface 12a without being totally reflected by the outer surface of the cladding 12.

The angle p at which the conical surface 220a is inclined with respect to the flat surface 220b of the conical lens 220 is selected to satisfy the equations (201) and (202) referred to above. In this embodiment, the core 11 of PRA has a diameter of 2.0 μm, the cladding 12 of LaFN2 glass has a diameter of 3 mm, the refractive index n of the cladding 12 with respect to the second harmonic wave 15' which has a wavelength $\lambda = 435$ nm, the phase matching angle $\theta o$ is $\theta o = 7.00°$, the second harmonic wave 15' is emitted from the cladding exit end surface 12a at an angle $\theta A = 12.4°$, and the refractive index nL of the SFS3 glass of the conical lens 220 is nL = 1.8249. Therefore, the angle $\rho$ is $\rho = 14.2°$. The conical wavefront of the second harmonic wave 15' is converted into a planar wavefront when it passes through the conical lens 220. After having passed through the conical lens 220, the second harmonic wave 15' can be focused into a small spot P when it passes through the condenser lens 19 which is a general spherical lens.

An effect of variations or fluctuations in the wavelength of the fundamental wave 15 or the second harmonic wave 15' will be considered below. Under the above numerical conditions, the angle $\theta A$ is $\theta A = 12.4°$, and the wavelength dependency thereof is:

$$\frac{\partial \theta A}{\partial \lambda} = -0.0071°/nm.$$

Figure 10:
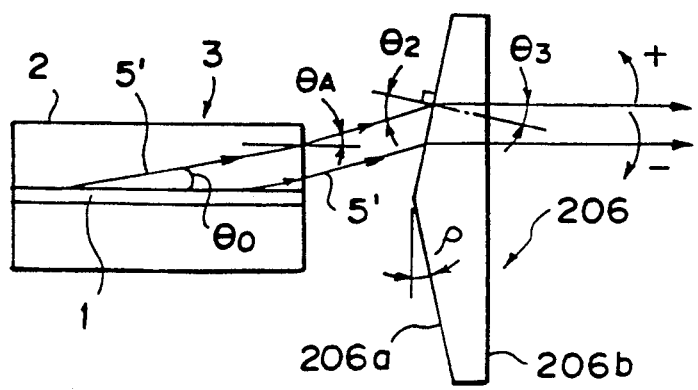
FIG. 10 is a side elevational view illustrative of the fundamental arrangement of a second optical wavelength converter system according to the present invention.

The sign of the angle is defined above with respect to FIG. 10. With respect to the equation (204), since $$-20 \times 10^{-4} \theta A = -0.0248°/nm,$$

$$-1.2 \times 10^{-4} \theta A = -0.0015°/nm$$

and $-0.0248 < -0.0071 < -0.0015$, the wavelength dependency of the angle $\theta A$ and the wavelength dependency of the angle $\theta p$ at which the second harmonic wave is emitted from the conical lens 220 vary so that they cancel out each other.

According to a comparative example, the cladding 12 is made of SFS3 glass, and the core material, the core diameter, the cladding diameter, and other numerical limitations are the same as those of the present embodiment. With such a comparative example, since $$\theta A = 28.4°, \text{ and}$$

$$\frac{\partial \theta A}{\partial \lambda} = -0.0848°/nm,$$

The wavelength dependencies do not vary so that they cancel out each other.

A wavefront aberration which actually occurs will be described below.

From the equation (203) and the value of $$\frac{\partial \theta A}{\partial \lambda} = -0.0071°/nm,$$

the wavelength dependency of the angle $\theta A$ and the wavelength dependency of the angle $\theta p$ ideally cancel out each other provided the following equation is satisfied:

$$-\theta A \frac{1}{nL-1} \frac{\partial nL}{\partial \lambda} = +0.0071°/nm.$$

In this case, it is necessary that the following equation be satisfied:

$$\frac{1}{nL-1} \frac{\partial nL}{\partial \lambda} = -5.73 \times 10^{-4}/nm.$$

Because the actual value of the SFS3 glass is $$\frac{1}{nL-1} \frac{\partial nL}{\partial \lambda} = -5.50 \times 10^{-4}/nm,$$

wavelength dependency of the angle $\theta p$ remains to be $$-(5.73-5.50) \times 10^{-4} \times 12.4 = -2.85 \times 10^{-4}°/nm.$$

Actually, when the wavelength of the fundamental wave 15 varies by ±2.5 nm (a total of 5 nm), i.e., when the wavelength λ of the second harmonic wave 15' varies by ±1.25 nm, the angle $\theta p$ varies by:

$$-2.84 \times 10^{-4} \times (\pm 1.25) = \pm 3.57 \times 10^{-4}°.$$

The p-p value (peak-to-peak value) $\epsilon$ of the wavefront aberration is given by:

$$\epsilon = (D/2)|\sin \Delta \theta|$$

where D is the effective diameter of the second harmonic wave 15' which has passed through the conical lens 220 and $\Delta \theta$ is an angular deviation of the wavefront. Therefore, if the effective diameter D is approximated to $D \approx Dc = 3$ mm $= 3000$ μm, then we get $$\epsilon = (3000/2) \times \sin(\pm 3.57 \times 10^{-4°})$$
$$= 0.00935 \text{ μm}$$
$$= 9.35 \text{ nm}.$$

Since $\lambda/4 = 435/4 = 108.8$ nm in this embodiment, the p-p value $\epsilon$ of the wavefront aberration remains smaller than $\lambda/4$.

Figure 13:
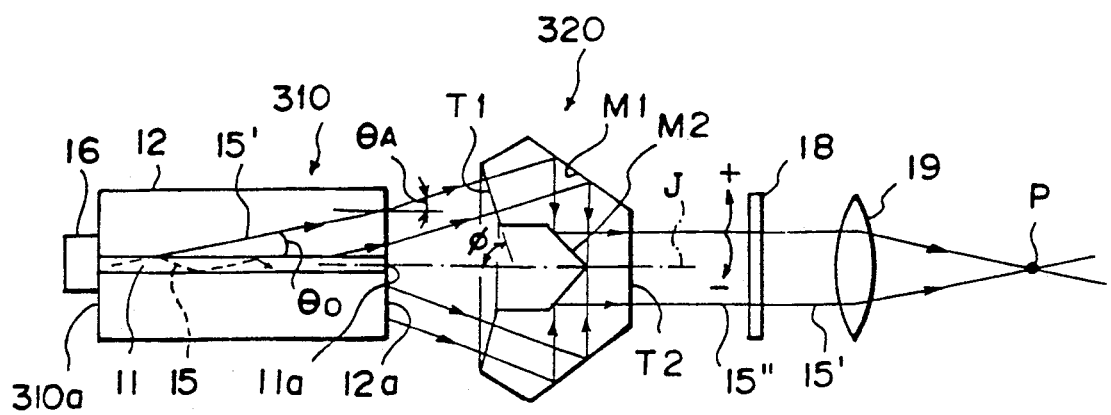
FIG. 13 is a side elevational view of an optical wavelength converter system according to a fourth embodiment of the present invention.

FIG. 13 shows an optical wavelength converter system according to a fourth embodiment of the present invention. The optical wavelength converter system shown in FIG. 13 includes an optical wavelength converter device 310 and a reflective optical device 320 for converting the conical wavefront of a wavelength-converted wave emitted from the optical wavelength converter device 310 into a planar wavefront. The optical wavelength converter device 310 is basically of the same construction as that of the optical wavelength converter device 210 shown in FIG. 11.

A laser beam (fundamental wave) 15, which is emitted from the semiconductor laser 16 directly fixed to an entrance end surface 310a of the device 310, enters the core 11. The fundamental wave 15 is converted into a second harmonic wave 15', whose wavelength is $\frac{1}{2}$ of the wavelength of the fundamental wave 15, by the PRA of the core 11.

The second harmonic wave 15' whose wavelength is $\lambda = 435$ nm is emitted from the cladding exit end surface 12a and enters the reflective optical device 320. The second harmonic wave 15' is emitted from the optical wavelength converter device 310 at an angle $\theta A = 15.7983°$. The wavelength dependency of the angle $\theta A$, i.e., a variation in the angle $\theta A$ at the time the wavelength λ of the second harmonic wave 15' varies by 1 nm, is as follows:

$$\frac{\partial \theta A}{\partial \lambda} = -0.0030°/nm.$$

The angle is positive if the second harmonic wave is directed away from the optical axis (i.e., in the direction to produce a divergent conical wavefront), and negative if the second harmonic wave is directed toward the optical axis (i.e., in the direction to produce a convergent conical wavefront), as shown in FIG. 13.

The reflective optical device 320 has its central axis J aligned with the center of the core 11 of the optical wavelength converter device 310. The reflective optical device 320 has an entrance surface T1 to which the second harmonic wave 15' is applied, a first reflecting surface M1 for reflecting the applied second harmonic wave 15' toward the optical axis J, a second reflecting surface M2 for reflecting the reflected second harmonic wave 15' in a direction away from the optical wavelength converter device 310, and an exit surface T2 for emitting the reflected second harmonic wave 15'. The entrance surface T1, the first reflecting surface M1, and the second reflecting surface M2 are respective conical shapes extending around the central axis J. The entrance surface T1 and the exit surface T2 are shaped such that the second harmonic wave 15' is applied perpendicularly to these surfaces so as not to be affected by the wavelength dependency of the refractive index of the reflective optical device 320. More specifically, the entrance surface T1 lies at an angle $\phi = 74.20°(\simeq 90 - 15.7983)$ with respect to the central axis J, and the exit surface T2 lies perpendicularly to the central axis J. The first and second reflecting surfaces M1, M2 are coated with reflecting layers.

Operation of the reflective optical device 320 will be described below. As shown in FIG. 12, the cladding 12 is thick enough for the second harmonic wave 15' radiated into the cladding 12 at a phase matching angle $\theta_o$ to be emitted out of the device 10 directly from the cladding exit end surface 12a without being totally reflected by the outer surface of the cladding 12.

The conical wavefront of the second harmonic wave 15' can be converted into a planar wavefront if angles $\theta M1$, $\theta M2$ at which the first and second reflective surfaces M1, M2 are inclined with respect to the central axis J are selected as described below. After having passed through the optical device 320, the second harmonic wave 15' can be focused into a small spot P when it passes through the condenser lens 19 which is a general spherical lens.

Figure 14:
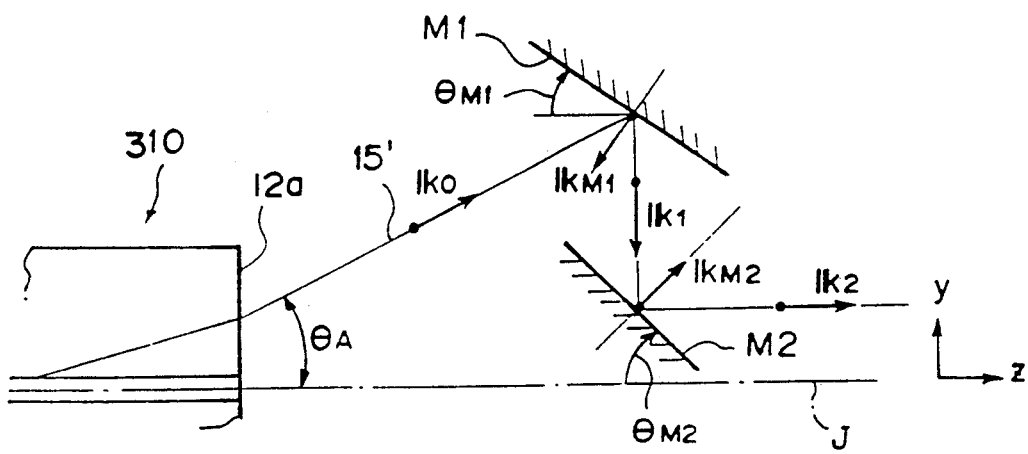
FIG. 14 is a schematic view illustrative of configurations of reflective optical devices in the system shown in FIG. 13.

The angles $\theta M1$, $\theta M2$ of the first and second reflective surfaces M1, M2 with respective to the central axis J for such wavefront conversion will be described below with reference to FIG. 14. For the sake of brevity, the angles $\theta M1$, $\theta M2$ in only a z-y cross-sectional plane containing the central axis J will be considered.

There are established wave number vectors K0, K1, k2, kM1, kM2 respectively in the direction in which the second harmonic wave 15' is emitted from the cladding exit end surface 12a, the direction in which the second harmonic wave 15' is reflected by the first reflecting surface M1, the direction in which the second harmonic wave 15' is reflected from the second reflecting surface M2, the direction normal to the first reflecting surface M1, and the direction normal to the second reflecting surface M2. The wave number vector k0 has a component k0z in a z-direction and a component k0y in a y-direction, and the other wave vectors k1, K2, kM1, kM2 have corresponding components k1z and k1y, k2z and k2y, kM1z and kM1y, and kM2z and kM2y, respectively. The following equations are then satisfied:

$k0z = \cos \theta A$, $k0y = \sin \theta A$, $kM1z = -\sin \theta M1$, $kM1y = -\cos \theta M1$, $kM2z = \sin \theta M2$, and $kM2y = \cos \theta M2$.

The magnitude of each of the vectors is normalized to 1.

When a light beam is applied to a reflecting surface, wave number vectors k, k', and kM respectively in the direction in which the light beam is applied to the reflecting surface, the direction in which the light beam is reflected from the reflecting surface, and the direction normal to the reflecting surface, satisfy the following equation:

$k' = -2 (k \cdot kM)kM - k$.

When the light beam is reflected from the first reflecting surface M1, therefore, the wave number vectors satisfy the following equations:

$|k1 = -2(|k0 \cdot |kM1) |kM1 + |k0$, $|k0 \cdot |kM1 = -\cos \theta A \sin \theta M1 - \sin \theta A \cos \theta M1$ $= -\sin (\theta A + \theta M1)$, and $\begin{pmatrix} k1z \\ k1y \end{pmatrix} = 2 \sin (\theta A + \theta M1) \begin{pmatrix} -\sin \theta M1 \\ -\cos \theta M1 \end{pmatrix} + \begin{pmatrix} \cos \theta A \\ \sin \theta A \end{pmatrix}$.

When the light beam is reflected from the second reflecting surface M2, the wave number vectors satisfy the following equations:

$|k2 = -2(|k1 \cdot |kM2) |kM2 + |k1$, and $|k1 \cdot |kM2 = -2 \sin (\theta A + \theta M1) \sin \theta M1 \sin \theta M2 + \cos \theta A \sin \theta M2 - 2 \sin (\theta A + \theta M1) \cos \theta M1 \cos \theta M2 + \sin \theta A \cos \theta M2$ $= -2 \sin (\theta A + \theta M1) \cos (\theta M1 - \theta M2) + \sin (\theta A + \theta M2)$.

If the latter equation is equalized to A, then $\begin{pmatrix} k2z \\ k2y \end{pmatrix} = -2A \begin{pmatrix} \sin \theta M2 \\ \cos \theta M2 \end{pmatrix} - \begin{pmatrix} k1z \\ k1y \end{pmatrix}$.

Therefore, if the angles $\theta M1$, $\theta M2$ are selected to satisfy the equation:

$\begin{pmatrix} k2z \\ k2y \end{pmatrix} = \begin{pmatrix} 1 \\ 0 \end{pmatrix}$.

then it is possible to convert the conical wavefront of the second harmonic wave 15' into a planar wavefront.

In view of the above considerations, the angles $\theta M1$, $\theta M2$ are selected as follows:

$\theta M1 = 37.10085°$ $\theta M2 = 45°$ in this embodiment.

Figure 15:
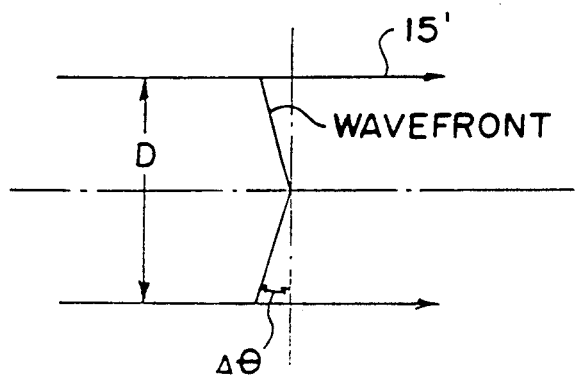
FIG. 15 is a schematic view illustrative of wavefront aberration.

An effect of variations or fluctuations in the wavelength of the fundamental wave 15 or the second harmonic wave 15' will be considered below. As shown in FIG. 15, the p-p value (peak-to-peak value) $\epsilon$ of the wavefront aberration is given by:

$\epsilon = (D/2) \sin \Delta\theta$ where D is the effective diameter of the second harmonic wave 15' which has passed through the reflective optical device 320 and $\Delta\theta$ is an angular deviation of the wavefront. Generally, as described above, a well focused beam spot can be obtained if the value of $\epsilon$ is $\lambda/4$ or less. Therefore, $(D/2)|\sin \Delta\theta| < \lambda/4$, and hence $|\Delta\theta| < \sin^{-1}(\lambda/2D)$ \hfill (301)

The semiconductor laser 16 which emits the fundamental wave 15 has a longitudinal mode interval which is at least about 2 nm. When mode hopping occurs in the semiconductor laser 16, the wavelength of the secondary harmonic wave varies or fluctuates by $\Delta\lambda$ that is about 1 nm. Since $$\Delta\theta = \frac{\partial \theta A}{\partial \lambda} \Delta\lambda,$$

the following inequality is obtained:

$$\left|\frac{\partial \theta}{\partial \lambda}\right| < \sin^{-1}(\lambda/2D) \quad (302)$$

from the inequality (301) if $\Delta\lambda = 1$ (nm). Therefore, the p-p value $\epsilon$ of the wavefront aberration is smaller than $\lambda/4$ if the inequality (302) is satisfied.

Now, whether the inequality (302) is satisfied or not in this embodiment will be checked below. As described above, the following equation is satisfied:

$$\frac{\partial \theta A}{\partial \lambda} = -0.0030°/nm.$$

The wavelength $\lambda$ is $\lambda = 435$ nm. If the effective diameter D of the second harmonic wave 15' is approximated to $D \approx D_0 = 3$ mm, then $$\sin^{-1}(\lambda/2D)$$
$$= \sin^{-1}(453/3 \times 10^6)$$
$$= 0.0083.$$

Since $0.0030 < 0.0083$, the above inequality (302) is satisfied.

Specifically, the p-p value $\epsilon$ of the wavefront aberration is $$\epsilon = \frac{3 \times 10^6}{2} \times \sin 0.0030°$$
$$= 78.6 \text{ nm}.$$

Because $\epsilon = 0.18\lambda$, this value is naturally smaller than $\lambda/4 = 0.25\lambda$.

Figure 16:
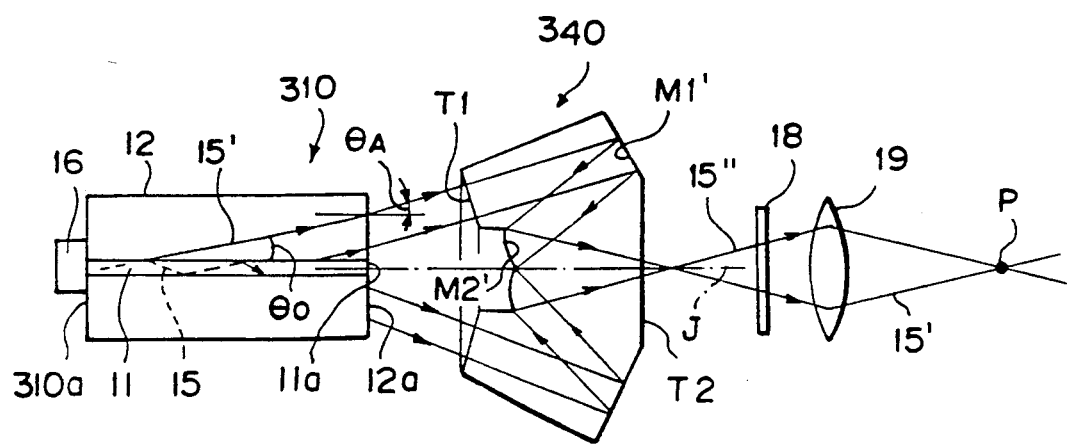
FIG. 16 is a side elevational view of an optical wavelength converter system according to a fifth embodiment of the present invention.
Figure 17:
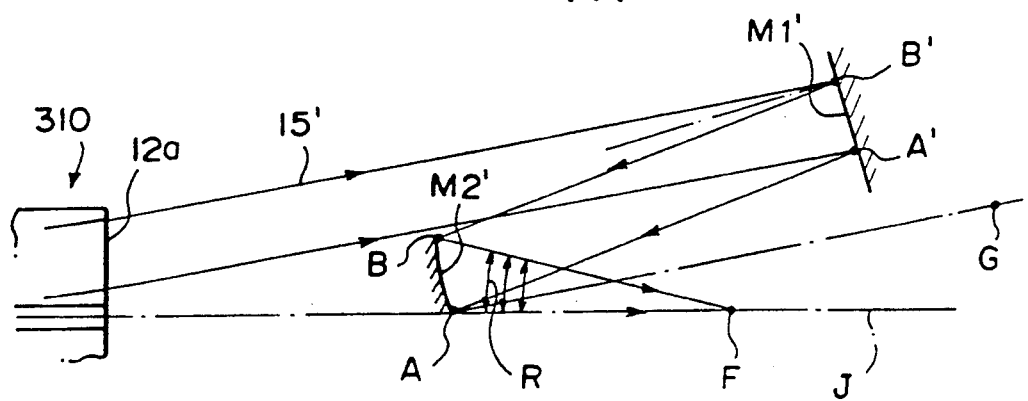
FIG. 17 is a schematic view illustrative of configurations of reflective optical devices in the system shown in FIG. 16.

An optical wavelength converter system according to a fifth embodiment of the present invention will be described below with reference to FIG. 16. The optical wavelength converter system according to the fifth embodiment includes an optical wavelength converter device 310 which is identical to the optical wavelength converter device in the fourth embodiment. The optical wavelength converter system also has a reflective optical device 420 which includes an entrance surface T1, an exit surface T2, a first reflecting surface M1', and a second reflecting surface M2'. The entrance surface T1 and the first reflecting surface M1' are conical in shape. The second reflecting surface M2' is substantially conical in shape, but has an arcuate cross-sectional shape. In FIG. 17, a line segment AB defining the second reflecting surface M2' is an arc extending about a point G. The second reflecting surface M2' focuses a light beam in a position F which is positioned on the central axis J. The angle ∠A'AG is equal to the angle ∠GAF.

When the second harmonic wave 15' passes through the reflective optical device 340, the conical wavefront of the second harmonic wave 15' is converted into a convergent spherical wavefront as indicated by the arrows R in FIG. 17. After having passed through the reflective optical device 340, the second harmonic wave 15' can be focused into a small spot P when it passes through the condenser lens 19 which is a general spherical lens.

While the first reflecting surface M1' is conical and the second reflecting surface M2' is substantially conical with a curvature given thereto, the first reflecting surface M1' may be a surface with a curvature and the second reflecting surface M2' may be a conical surface. The reflecting surface with a curvature is not limited to an arcuate cross-sectional shape, but may be an elliptical cross-sectional shape, a parabolic cross-sectional shape, or a hyperbolic cross-sectional shape.

In FIG. 17, the length AG $\approx$ the length 2AF. As the angle ∠GAF (or rather ∠GBF) increases, the coma increases and the length $\overline{AF}$ varies. In order to avoid such a drawback, the second reflecting surface M2' should preferably be of an aspherical cross-sectional shape with high-order correction, rather than arcuate, parabolic, and hyperbolic cross-sectional shapes.

Figure 18:
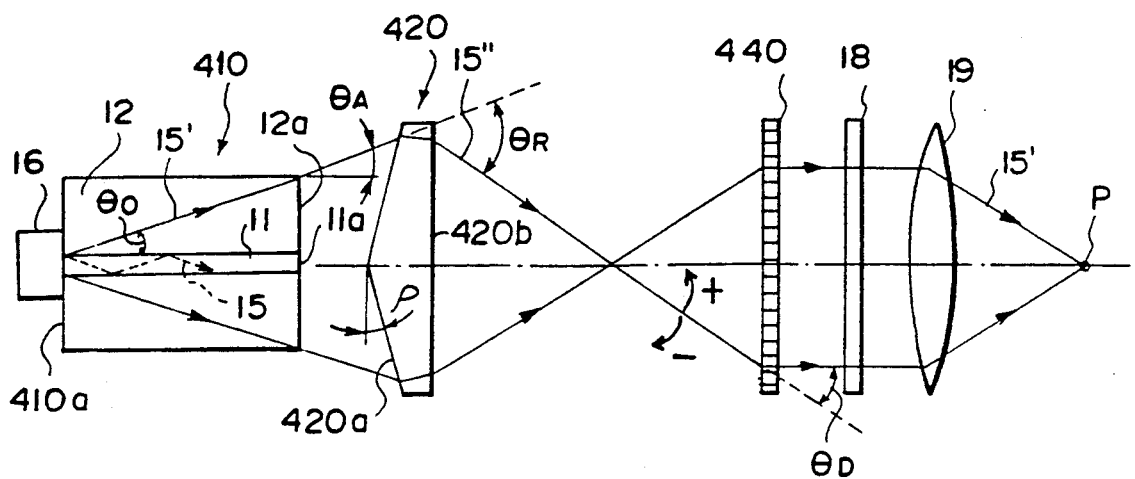
FIG. 18 is a side elevational view of an optical wavelength converter system according to a sixth embodiment of the present invention.

FIG. 18 shows an optical wavelength converter system according to a sixth embodiment of the present invention. The optical wavelength converter system shown in FIG. 18 includes an optical wavelength converter device 410, a conical lens 420 serving as an optical device for effecting wavefront conversion, and a grating device 440 serving as another optical device for effecting wavefront conversion. The optical wavelength converter device 410 is basically of the same construction as that of the optical wavelength converter device 210 shown in FIG. 11.

The conical lens 420 is made of SFS3 glass and has a conical surface 420a facing the optical wavelength converter device 410 and a flat surface 420b opposite to the conical surface 420a.

Figure 19:
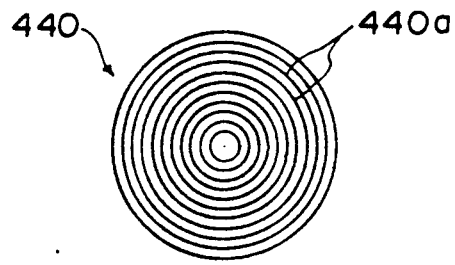
FIG. 19 is a front elevational view of a grating composed of equally spaced concentric patterns in the system shown in FIG. 18.

The grating device 440 is positioned farther from the optical wavelength converter device 410 than the conical lens 420. As shown in FIG. 19, the grating device 440 comprises a plurality of equally spaced concentric grating patterns 440. The grating device 440 may be fabricated by the known photolithographic process.

A laser beam (fundamental wave) 15, which is emitted from the semiconductor laser 16 directly fixed to an entrance end surface 410a of the device 410, enters the core 11. The fundamental wave 15 is converted into a second harmonic wave 15', whose wavelength is ½ of the wavelength of the fundamental wave 15, by the PRA of the core 11.

The second harmonic wave 15' is emitted from the cladding exit end surface 12a, and collimated by the conical lens 420 and the grating device 440. The fundamental wave 15, which as been guided through the core 11, is also emitted from an exist end surface 11a of the core 11. A light beam 15", which contains the second harmonic wave 15' and the fundamental wave 15, then goes through a filter 18 which passes only the second harmonic wave 15'. Therefore, only the second harmonic wave 15' is extracted by the filler 18. The second harmonic wave 15' then passes through a condenser lens 19 in the form of a general spherical lens by which is it converged into a small beam spot P.

Operation of the conical lens 420 and the grating device 440 will be described in detail below. The cladding 12 is thick enough for the second harmonic wave 15' radiated into the cladding 12 at a phase matching angel $\theta$o to be emitted out of the device 10 directly from the cladding exit end surface 12a without being totally reflected by the outer surface of the cladding 12 (see FIG. 12).

Figure 20:
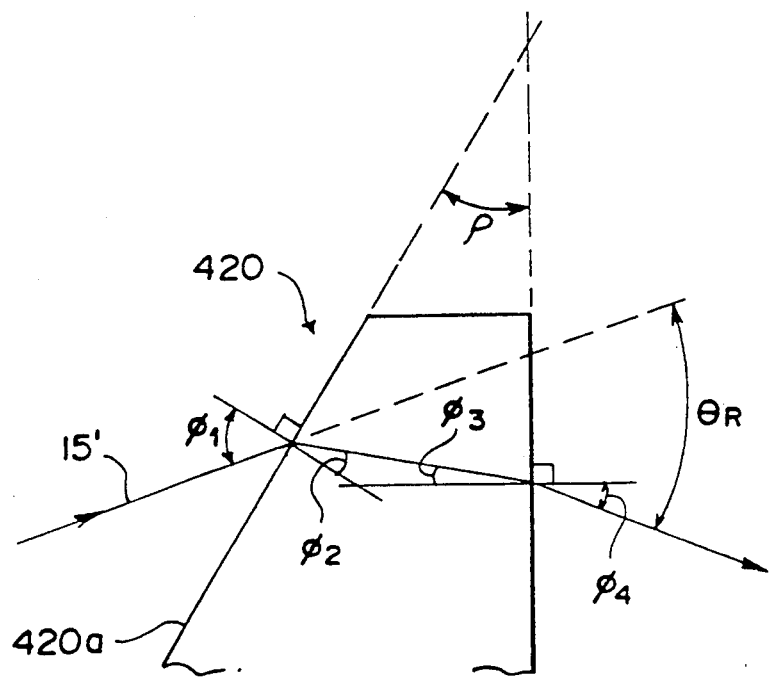
FIG. 20 is an enlarged fragmentary side elevational view illustrative of refraction of a light beam by a conical lens in the system shown in FIG. 18.

The angle ρ at which the conical surface 420a is inclined with respect to the flat surface 420b of the conical lens 420, the angle $\theta$R through which the second harmonic wave 15' is deflected by the conical lens 420, and the refractive index nL of the SFS3 glass of the conical lens 420 with respect to the wavelength λ=435 nm of the second harmonic wave 15', satisfy the following equations:

$$\sin \phi_1 = nL \sin \phi_2 \qquad (403)$$
$$= nL \sin (\rho - \phi_3)$$
$$nL \sin \phi_3 = \sin \phi_4$$
$$\theta R = \phi_1 + \phi_4 - \rho,$$

as shown in FIG. 20. If sin x approximates x, then the following equation results:

$$\theta R \approx (nL - 1)\rho.$$

Since the refractive index nL varies as the wavelength λ of the second harmonic wave 15' varies, and the angle $\theta$R varies as the refractive index nL varies, the following equation is satisfied:

$$(\theta R + \Delta\theta R) \approx \left( nL + \frac{\Delta nL}{\Delta\lambda} \Delta\lambda - 1 \right)\rho.$$

Hence, $\dfrac{\Delta\theta R}{\Delta\lambda} \approx \dfrac{\Delta nL}{\Delta\lambda} \rho \approx \dfrac{\theta R}{nL-1} \dfrac{\Delta nL}{\Delta\lambda}$.

Therefore, with the sign of the angle being defined as shown in FIG. 18, the wavelength dependency of the angle $\theta$R is expressed as follows:

$$\frac{\partial \theta R}{\partial \lambda} \approx -\frac{\partial nL}{\partial \lambda} \rho \approx -\frac{\theta R}{nL - 1} \frac{\partial nL}{\partial \lambda}. \qquad (404)$$

Because $\partial nL/\partial\lambda < 0$ in general, the angle $\theta$R decreases as the wavelength λ increase.

The angle $\theta$D through which the light beam 15" is diffracted by the grating device 440 and the grating pitch Λ of the grating device 440 satisfy the following equation:

$$\sin \theta D \approx \lambda/\Lambda \qquad (405)$$

and approximately, $$\theta D \approx \lambda/\Lambda$$

Therefore, the following equation is satisfied:

$$(\theta R + \Delta\theta D) \approx (\lambda + \Delta\lambda)/\Lambda.$$

Hence, $$\frac{\partial \theta A}{\partial \lambda} + \frac{\partial \theta t}{\partial \lambda} \approx 0$$

Therefore, the wavelength dependency of the angle $\theta$D is expressed as follows:

$$\frac{\partial \theta D}{\partial \lambda} \approx \frac{1}{\Lambda} \approx \frac{1}{\lambda}. \qquad (406)$$

Because $1/\lambda < 0$ in general, the angle $\theta$D decreases as the wavelength λ increases.

As described above, in order for the second harmonic wave 15', after having passed through the grating device 440, to be collimated, the angles $\theta$A, $\theta$R, $\theta$D should satisfy the equation:

$$\theta A - \theta R + \theta D = 0 \qquad (407).$$

In order to produce no wavefront aberration when the wavelength of the fundamental wave, i.e., the wavelength λ of the second harmonic wave λ, the equation (401), referred to above, should be satisfied:

$$\frac{\partial \theta A}{\partial \lambda} + \frac{\partial \theta t}{\partial \lambda} \approx 0$$

where $\partial\theta t/\partial\lambda$ is the wavelength dependency of the total angle $\theta$t which is equal to the sum of the angles $\theta$R and $\theta$D, and $\partial\theta A/\partial\lambda$ is the wavelength dependency of the angle $\theta$A. In this embodiment, the diameter of the core 11 of PRA is 2.0 μm, the diameter of the cladding 12 of SFS3 glass is 3 mm, the refractive index n of the cladding 12 with respect to the second harmonic wave 15' whose wavelength λ is λ=435 nm is n=1.8249, the phase matching angle $\theta$o=15.1°, the angle $\theta$A is $\theta$A=28.4°, and the wavelength dependency of the angle $\theta$A is:

$$\frac{\partial \theta A}{\partial \lambda} = -0.085°/nm.$$

From the equations (404), (406), we get $$\frac{\partial \theta t}{\partial \lambda} = -\frac{\theta R}{nL - 1} \frac{\partial nL}{\partial \lambda} + \frac{1}{\lambda} \theta D \qquad (408)$$

If the value of the equation (408) is +0.085°/nm, then the wavelength dependency of the angle $\theta$t and the wavelength dependency of the angle $\theta$A compensate for each other.

Inasmuch as $1/\lambda = 23.0 \times 10^{-4}/nm$, and $$\frac{1}{nL - 1} \frac{\partial nL}{\partial \lambda} = 5.5 \times 10^{-4}/nm$$

for the SFS3 glass, these values are substituted in the equation (408), and the left-hand side of the equation is equalized to +0.085°/nm. When the value of $\theta$A=28.4° is substituted in the equation (407), we get $$\theta R = 52.7°, \theta D = 24.3°.$$

From the value of $\theta$R=52.7° and the equation (403), the angle ρ of the conical surface 420a of the conical lens 420 is determined as ρ=44.67°. From the value of $\theta$D=24.3° and the equation (405), the grating pitch Λ of the grating device 440 is determined as Λ=1.06 μm.

When the second harmonic wave 15' passes through the conical lens 420 and the grating device 440, the conical wavefront of the second harmonic wave 15' is converted into a planar wavefront, and thereafter, the second harmonic wave 15' can be focused into a small spot P when it passes through the condenser lens 19 which is a general spherical lens.

Since the equation (401) is satisfied, when the wavelength of the fundamental wave, i.e., the wavelength $\lambda$ of the second harmonic wave 15' varies, the angle $\theta A$ at which the second harmonic wave 15' is emitted from the optical wavelength converter device 410 and the angle $\theta D$ at which the light beam 15'' is emitted from the grating device 440 vary so that they cancel out each other. Therefore, even when the wavelength of the fundamental wave varies, the second harmonic wave 15' is prevented from suffer a wavefront aberration after the wavefront thereof has been converted, with the result the second harmonic wave 15' remains well focused into the small spot P.

The optical wavelength converter system according to the sixth embodiment is summarized as follows: The condition to be met for preventing the second harmonic wave 15' from suffering a wavefront aberration after the wavefront thereof has been converted is given by:

$$\frac{\partial \theta A}{\partial \lambda} + \frac{\partial \theta t}{\partial \lambda} = 0 \tag{401}$$

(this condition holds true for seventh through thirteen embodiments described below), and $$\frac{\partial \theta t}{\partial \lambda} = -\frac{\theta R}{nL - 1} \frac{\partial nL}{\partial \lambda} + \frac{1}{\lambda} \theta D$$
$$= -\frac{\partial nL}{\partial \lambda} \rho + \frac{1}{\Lambda}.$$

As described above, as the wavelength $\lambda$ increases, the angle $\theta R$ decreases and the angle $\theta D$ increases. Therefore, the angle $\theta t$ becomes greater than would be possible if only the conical lens 420 or the grating device 440 were employed. The large angle $\theta t$ can cope with an optical wavelength converter device 410 in which the wavelength dependency $\partial \theta A/\partial \lambda$ of the angle $\theta A$ is very large. This holds true for the seventh, tenth, and eleventh embodiments described below.

Figure 21:
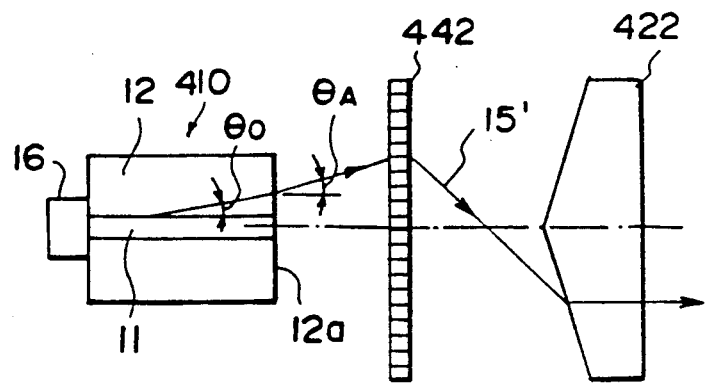

An optical wavelength converter system according to a seventh embodiment of the present invention will be described below with reference to FIG. 21.

The optical wavelength converter system according to the sixth embodiment (and also the tenth and sixteenth embodiments) is effective when the wavelength dependency $\partial \theta A/\partial \lambda$ of the angle $\theta A$, i.e., the wavelength dependency $\partial \theta o/\partial \lambda$ of the phase matching angle $\theta o$ is of a negative value. However, the optical wavelength converter system according to the seventh embodiment (and also the eleventh and fourteenth embodiments) is effective when the above wavelength dependency is of a positive value.

In the seventh embodiment, a grating device 442 composed of equally spaced concentric grating patterns is positioned closer to the optical wavelength converter device 410, and a conical lens 422 is positioned remotely from the optical wavelength converter device 410. With this arrangement, the following equation is satisfied:

$$\frac{\partial \theta t}{\partial \lambda} = \frac{1}{\lambda} \theta D + \frac{\theta R}{nL - 1} \frac{\partial nL}{\partial \lambda}$$
$$= -\frac{1}{\Lambda} + \frac{\partial nL}{\partial \lambda} \rho$$

Figure 22:
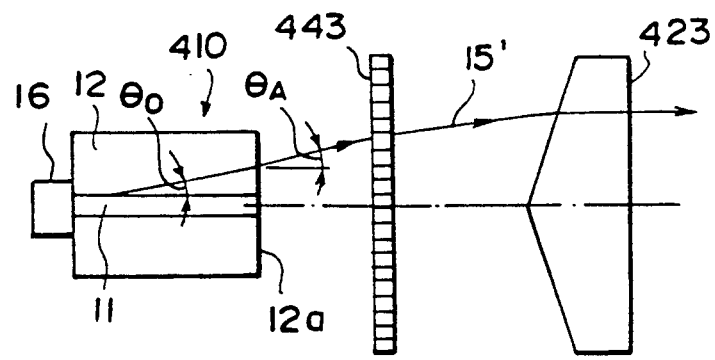

An optical wavelength converter system according to an eighth embodiment of the present invention will be described below with reference to FIG. 22.

The optical wavelength converter system according to the eighth embodiment (and also the ninth, twelfth, thirteenth, fifteenth, and seventeenth embodiments) is effective when the wavelength dependency of the phase matching angle $\theta o$, i.e., the angle $\theta A$ is of a value which is relatively close to 0.

In the eighth embodiment, a grating device 443 composed of equally spaced concentric grating patterns is positioned closer to the optical wavelength converter device 410, and a conical lens 423 is positioned remotely from the optical wavelength converter device 410. With this arrangement, the following equation is satisfied:

$$\frac{\partial \theta t}{\partial \lambda} = \frac{\theta R}{nL - 1} \frac{\partial nL}{\partial \lambda} - \frac{1}{\lambda} \theta D \tag{409}$$
$$= -\frac{\partial nL}{\partial \lambda} \rho - \frac{1}{\Lambda}$$

As described above, as the wavelength $\lambda$ increases, the angle $\theta R$ decreases and the angle $\theta D$ increases. Therefore, the angle $\theta t$ becomes smaller than would be possible if only the conical lens 423 or the grating device 443 were employed. The small angle $\theta t$ can cope with an optical wavelength converter device 410 in which the wavelength dependency $\partial \theta A/\partial \lambda$ of the angle $\theta A$ is close to zero. This holds true for the ninth, twelfth, and thirteenth embodiments described below.

Figure 23:
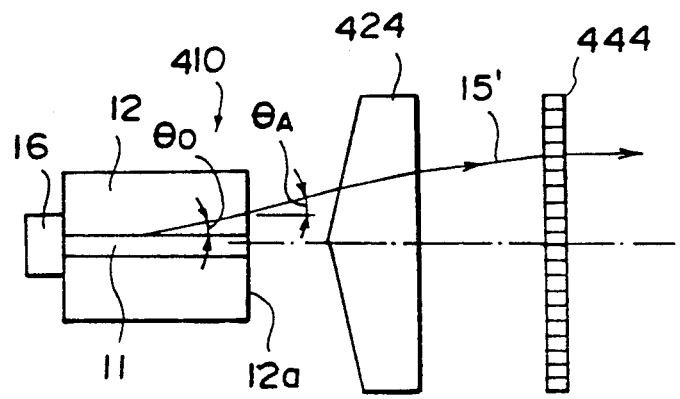

An optical wavelength converter system according to a ninth embodiment of the present invention will be described below with reference to FIG. 23.

In the ninth embodiment, a conical lens 424 is positioned closer to the optical wavelength converter device 410, and a grating device 444 composed of equally spaced concentric patterns is positioned remotely from the optical wavelength converter device 410. With this arrangement, the wavelength dependency $\partial \theta t/\partial \lambda$ is expressed by the equation (409) above.

Figure 24:
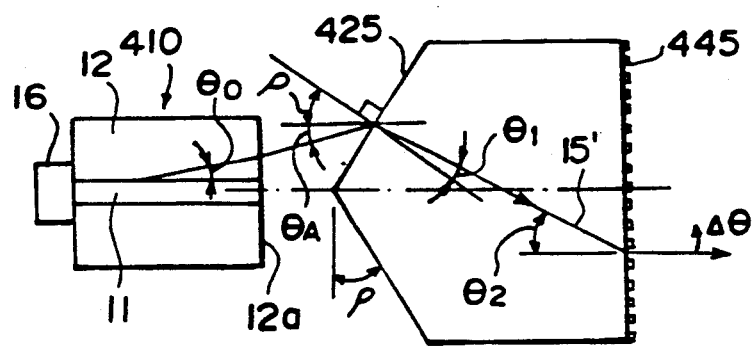

An optical wavelength converter system according to a tenth embodiment of the present invention will be described below with reference to FIG. 24.

In the tenth embodiment (and also the eleventh, twelfth, and thirteenth embodiments), a refractive optical device and a diffractive optical device are integrally formed with each other. More specifically, as shown in FIG. 24, a grating device 445 composed of equally spaced concentric patterns is formed on a flat surface of a conical lens 425. In FIG. 24, the refractive relationship is expressed by:

$$\sin(\theta A + \rho) = nL \sin \theta 1,$$

which is approximated by:

$$\theta A + \rho = nL \cdot \theta 1 \tag{410}$$

The following equation is also satisfied:

$$\theta 2 = \rho - \theta 1 \tag{411}$$

The equation for preserving the diffraction is given by:

$$nL \sin \theta_2 - \frac{\lambda}{\Lambda} = 0.$$

From this equation, we get $$nL\ \theta_2 = \lambda/\Lambda \qquad (412)$$

If the optical path of the second harmonic wave after it has been refracted varies by $\Delta\theta_1$ due to a wavelength variation $\Delta\lambda$ in the equation (410), then the following equation is satisfied:

$$\theta A + \rho = \left(nL + \frac{\partial nL}{\partial \lambda}\Delta\lambda\right)(\theta_1 + \Delta\theta_1).$$

From this equation, we get $$\Delta\theta_1 = -\frac{1}{nL}\frac{\partial nL}{\partial \lambda}\theta_1 \Delta\lambda \qquad (413)$$

(the term of $\Delta\lambda\Delta\theta_1$ is disregarded). When there is a wavelength variation and also there is an angle variation expressed by the equation (413), the equation (412) becomes:

$$\left(nL + \frac{\partial nL}{\partial \lambda}\Delta\lambda\right)(\theta_2 - \Delta\theta_1) - \frac{\lambda + \Delta\lambda}{\Lambda} = -\Delta\theta.$$

Hence, $$\frac{\partial nL}{\partial \lambda}\theta_2\Delta\lambda + \frac{\partial nL}{\partial \lambda}\theta_1\Delta\lambda - \frac{\Delta\lambda}{\Lambda} = -\Delta\theta.$$

Using the equation (411), the following equation is satisfied:

$$\frac{\partial \theta_t}{\partial \lambda} = -\frac{\partial nL}{\partial \lambda}\rho - \frac{1}{\Lambda}.$$

Figure 25:
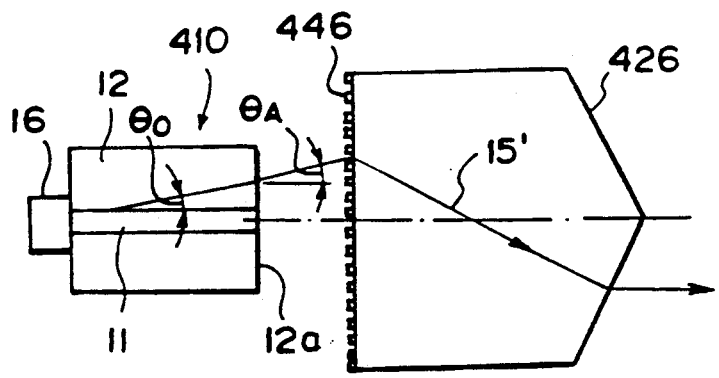

An optical wavelength converter system according to an eleventh embodiment of the present invention will be described below with reference to FIG. 25.

In the eleventh embodiment, a conical lens 426 is arranged such that a conical surface thereof faces away from the optical wavelength converter device 410 and a grating device 446 composed of equally spaced concentric patterns is formed on a flat surface of the conical lens 426 which faces toward the optical wavelength converter device 410. In this arrangement, the following equation is satisfied:

$$\frac{\partial \theta_t}{\partial \lambda} = -\frac{1}{\Lambda} + \frac{\partial nL}{\partial \lambda}\rho$$

Figure 26:
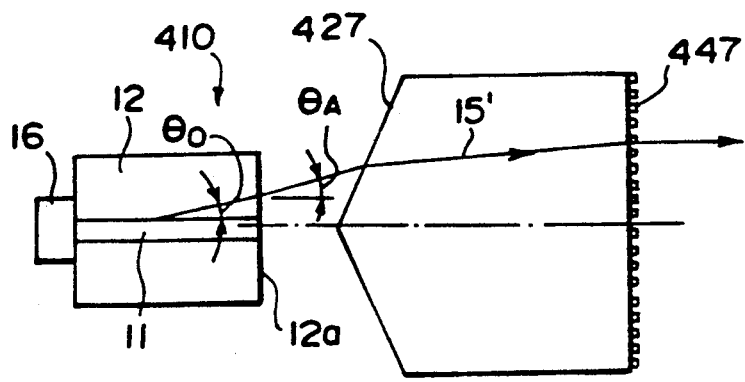

An optical wavelength converter system according to a twelfth embodiment of the present invention will be described below with reference to FIG. 26.

The optical wavelength converter system according to the twelfth embodiment is effective when the wavelength dependency of the phase matching angle $\theta_o$, i.e., the angle $\theta A$ is of a value which is relatively close to zero. A conical lens 427 has a conical surface directed toward the optical wavelength converter device 410, and a grating device 447 composed of equally spaced concentric patterns is formed on a flat surface of the conical lens 427 which faces away from the optical wavelength converter device 410. In this arrangement, the following equation is satisfied:

$$\frac{\partial \theta_t}{\partial \lambda} = -\frac{\partial nL}{\partial \lambda}\rho - \frac{1}{\Lambda} \qquad (414)$$

An optical wavelength converter system according to a thirteenth embodiment of the present invention will be described below with reference to FIG. 27.

The optical wavelength converter system according to the twelfth embodiment is also effective when the wavelength dependency of the phase matching angle $\theta_o$, i.e., the angle $\theta A$ is of a value which is relatively close to zero. A conical lens 428 has a conical surface directed away from the optical wavelength converter device 410, and a grating device 448 composed of equally spaced concentric patterns is formed on a flat surface of the conical lens 428 which faces toward the optical wavelength converter device 410. In this arrangement, the wavelength dependency $\partial\theta_t/\partial\lambda$ is indicated by the equation (414).

An optical wavelength converter system according to an fourteenth embodiment of the present invention will be described below with reference to FIG. 28.

In the fourteenth embodiment (and also the fifteenth, sixteenth, and seventeenth embodiments), one of refractive and diffractive optical devices is formed on the cladding exit end surface of the fiber-type optical wavelength converter device 410. If the equation (402):

$$n\frac{\partial \theta_o}{\partial \lambda} + \frac{\partial \theta_t}{\partial \lambda} = 0 \qquad (402)$$

is satisfied in this arrangement, then when the wavelength of the fundamental wave varies, the phase matching angle or the angle at which the wavelength-converted wave is applied to the optical device on the cladding exit end surface, and the angle at which the wavelength-converted wave is emitted from the second optical device vary so that they cancel out each other.

According to the fourteenth embodiment, a grating device 449 composed of equally spaced concentric patterns is disposed on a flat cladding exit end surface 12a, and a conical lens 429 is positioned separately from the grating device 449. The optical wavelength converter system shown in FIG. 28 is effective when the wavelength dependency of the phase matching angle $\theta_o$ is of a positive value.

In FIG. 28, the equation for preserving the diffraction is given as follows:

$$n \sin \theta_0 - \lambda/\Lambda = -\sin \theta_1,$$

which is approximated by:

$$n\theta_o - \lambda/\Lambda = -\theta_1 \qquad (415)$$

The refractive relationship at the first surface of the conical lens 429 is expressed by:

$$\sin(\theta_1 + \rho) = nL \sin \rho.$$

which is also approximated by:

$$\theta_1 + \rho = nL\rho \qquad (416)$$

If the optical path of the second harmonic wave after it has been refracted varies by $\Delta\theta 1$ due to a wavelength variation $\Delta\lambda$ in the equation (415), then the following equation is satisfied:

$$\left(n + \frac{\partial n}{\partial \lambda}\Delta\lambda\right)\theta o - \frac{\lambda + \Delta\lambda}{\Lambda} = -(\theta 1 + \Delta\theta 1).$$

Hence, $$\Delta\theta 1 = -\frac{\partial n}{\partial \lambda}\theta o \Delta\lambda + \frac{1}{\Lambda}\Delta\lambda.$$

The equation (416) of the refractive relationship at this time becomes:

$$\theta 1 + \Delta\theta 1 + \rho = \left(nL + \frac{\partial nL}{\partial \lambda}\Delta\lambda\right)(\rho - \Delta\rho).$$

From the above equation, we get $$\Delta\theta 1 = \frac{\partial nL}{\partial \lambda}\rho\Delta\lambda - nL\Delta\rho.$$

Hence, $$\frac{\Delta\rho}{\Delta\lambda} = \frac{1}{nL}\left(\frac{\partial nL}{\partial \lambda}\rho + \frac{\partial n}{\partial \lambda}\theta o - \frac{1}{\Lambda}\right).$$

Taking into account the refraction at the second surface of the conical lens 419, the final angle variation $\Delta\theta/\Delta\lambda$, i.e., the wavelength dependency of the angle $\theta t$ is given as follows:

$$\frac{\partial \theta t}{\partial \lambda} = \frac{\partial nL}{\partial \lambda}\rho - \frac{\partial n}{\partial \lambda}\theta o - \frac{1}{\Lambda}.$$

As described above, as the wavelength $\lambda$ increases, the angle $\theta R$ decreases and the angle $\theta D$ increases. Therefore, the angle $\theta t$ becomes larger than would be possible if only the conical lens 429 or the grating device 449 were employed. The large angle $\theta t$ can cope with an optical wavelength converter device 410 in which the wavelength dependency $\partial\theta o/\partial\lambda$ of the phase matching angle $\theta o$ is close to zero. This holds true for the sixteenth embodiment described below.

An optical wavelength converter system according to a fifteenth embodiment of the present invention will be described below with reference to FIG. 29.

In the fifteenth embodiment, a grating device 450 composed of equally spaced concentric patterns is disposed on a flat cladding exit end surface 12a, and a conical lens 430 is positioned separately from the grating device 450. The optical wavelength converter system shown in FIG. 29 is effective when the wavelength dependency of the phase matching angle $\theta o$ is of a value which is relatively close to zero. In this arrangement, the following equation is satisfied:

$$\frac{\partial \theta t}{\partial \lambda} = -\frac{\partial nL}{\partial \lambda}\rho + \frac{\partial n}{\partial \lambda}\theta o - \frac{1}{\Lambda}.$$

As described above, as the wavelength $\lambda$ increases, the angle $\theta R$ decreases and the angle $\theta D$ increases. Therefore, the angle $\theta t$ becomes smaller than would be possible if only the conical lens 430 or the grating device 450 were employed. The large angle $\theta t$ can cope with an optical wavelength converter device 410 in which the wavelength dependency $\partial\theta o/\partial\lambda$ of the phase matching angle $\theta o$ is close to zero. This holds true for the seventeenth embodiment described below.

An optical wavelength converter system according to a sixteenth embodiment of the present invention will be described below with reference to FIG. 30.

In the sixteenth embodiment, a cladding exit end surface 431 is shaped into a conical surface serving as a refractive optical device, and a grating device 451 composed of equally spaced concentric patterns is disposed separately from the cladding exit end surface 431. The optical wavelength converter system shown in FIG. 30 is effective when the wavelength dependency of the phase matching angle $\theta o$ is of a negative value.

Figure 30:
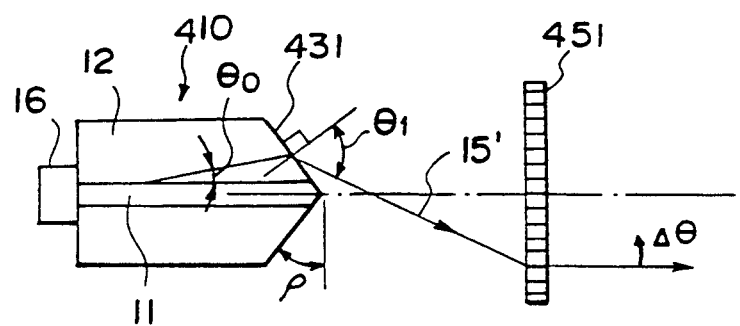

In FIG. 30, the refractive relationship at the cladding exit end surface 431 is given by:

$$n \sin(\rho - \theta o) = \sin\theta 1$$

where $\rho$ is the angle at which the cladding exit end surface 431 is inclined. The above equation is approximated by:

$$n(\rho - \theta o) = \theta 1 \tag{417}.$$

The equation for preserving the diffraction is expressed by:

$$\sin(\theta 1 - \rho) - \lambda/\Lambda = 0.$$

which is also approximated by:

$$\theta 1 - \rho\lambda/\Lambda = 0.$$

If the optical path of the second harmonic wave after it has been refracted varies by $\Delta\theta 1$ due to a wavelength variation $\Delta\lambda$ in the equation (417), then the following equation is satisfied:

$$\left(n + \frac{\partial n}{\partial \lambda}\Delta\lambda\right)(\rho - \theta o) = \theta 1 + \Delta\theta 1.$$

Hence, $$\Delta\theta 1 = \frac{\partial n}{\partial \lambda}(\rho - \theta o)\Delta\lambda.$$

In the subsequent diffraction, the following equation is satisfied:

$$\theta 1 + \Delta\theta 1 - \rho - (\lambda + \Delta\lambda) = -\Delta\theta.$$

From this equation, we get $$\frac{\partial n}{\partial \lambda}(\rho - \theta o)\Delta\lambda - \frac{\Delta\lambda}{\Lambda} = -\Delta\theta.$$

Therefore, the final angle variation $\Delta\theta/\Delta\lambda$, i.e., the wavelength dependency of the angle $\theta t$ is given as follows:

$$\frac{\partial \theta t}{\partial \lambda} = \frac{1}{\Lambda} - \frac{\partial n}{\partial \lambda}(\rho - \theta o).$$

Figure 31:
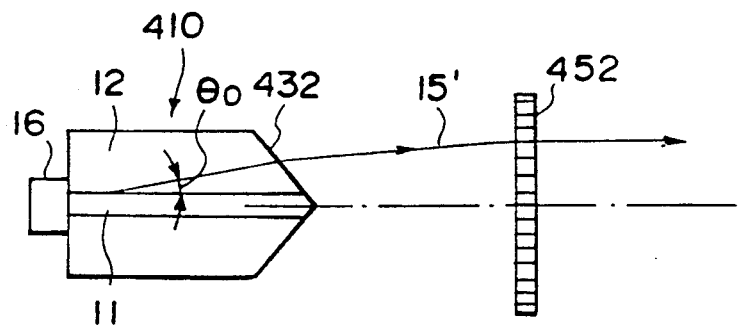

An optical wavelength converter system according to a seventeenth embodiment of the present invention will be described below with reference to FIG. 31.

In the seventeenth embodiment, a cladding exit end surface 432 is shaped into a conical surface serving as a refractive optical device, and a grating device 452 composed of equally spaced concentric patterns is disposed separately from the cladding exit end surface 432. The optical wavelength converter system shown in FIG. 31 is effective when the wavelength dependency of the phase matching angle $\theta o$ is of a value which is relatively close to zero. In this arrangement, the following equation is satisfied:

$$\frac{\partial \theta t}{\partial \lambda} = -\frac{1}{\lambda} - \frac{\partial n}{\partial \lambda}(\rho - \theta o).$$

The present invention has been described with respect to the various embodiments for converting a fundamental wave into a second harmonic wave. However, the principles of the present invention are also applicable to an optical wavelength converter system for converting a fundamental wave into a third harmonic wave, or an optical wavelength converter system for converting two fundamental waves having respective wavelengths into a wave which has a wavelength that is equal to the sum of the fundamental wave wavelengths or the difference between the fundamental wave wavelengths.

The present invention is also applicable to an optical wavelength converter device or system for converting the wavefront of a wavelength-converted wave from a conical wavefront into a spherical wavefront.

Although certain preferred embodiments have been shown and described, it should be understood that many changes and modifications may be made therein without departing from the scope of the appended claims.

I claim:

1. An optical wavelength converter device comprising an optical fiber including:
   i) a cladding having a first refractive index;
   ii) a core of a nonlinear optical material disposed in said cladding and having a second refractive index higher than said first refractive index, whereby said optical fiber converts the wavelength of a fundamental wave introduced into said core and radiates a wavelength-converted wave into said cladding;
   iii) said cladding having an exit end surface for emitting the wavelength-converted wave, said exit end surface having a conical or substantially conical shape for converting the conical wavefront of said wavelength-converted wave into a planar or spherical wavefront;
   iv) the material of said cladding and the diameter of said core being selected such that the wavelength dependencies $\partial \theta / \partial \lambda$, $\partial n / \partial \lambda$ of a phase matching angle $\theta o$ and a refractive index n of the cladding with respect to the wavelength-converted wave are related to each other as follows:

$$\frac{\partial \theta o}{\partial \lambda} \approx \frac{\theta o}{n(n-1)} \frac{\partial n}{\partial \lambda}$$

where $\lambda$ is the wavelength of the wavelength converted wave; and
   v) the difference between the left- and right-hand sides of the above equation falling within a range smaller than $\sin^{-1}(\lambda/2Dn)$, where D is the effective diameter of the wavelength-converted wave.

2. An optical wavelength converter system comprising:
   i) an optical fiber including a cladding having a first refractive index, and a core of a nonlinear optical material disposed in said cladding and having a second refractive index higher than said first refractive index, whereby said optical fiber converts the wavelength of a fundamental wave introduced into said core and radiates a wavelength-converted wave into said cladding, said cladding having an exit end surface for emitting the wavelength-converted wave;
   ii) an optical device disposed in a position to receive the wavelength-converted wave emitted from the said exit end surface, for diffractively converting the wavefront of the wavelength-converted wave from a conical wavefront into a planar or spherical wavefront; and
   iii) the material of said cladding and the diameter of said core being selected such that the wavelength dependency $\partial \theta A / \partial \lambda$ of an angle $\theta A$ at which the wavelength-converted wave is emitted from the cladding exit end surface approximates $\theta A / \lambda$ within an error range smaller than $\sin^{-1}(\lambda/2D)$ where $\lambda$ is the wavelength of the wavelength-converted wave, and D is the effective diameter of the wavelength-converted wave.

3. An optical wavelength converter system comprising:
   i) an optical fiber including a cladding having a first refractive index, and a core of a nonlinear optical material disposed in said cladding and having a second refractive index higher than said first refractive index, whereby said optical fiber converts the wavelength of a fundamental wave introduced into said core and radiates a wavelength-converted wave into said cladding, said cladding having an exit end surface for emitting the wavelength-converted wave;
   ii) an optical device disposed in a position to receive the wavelength-converted wave emitted from the said exit end surface, for refractively converting the wavefront of the wavelength-converted wave from a conical wavefront into a planar or spherical wavefront; and
   iii) the material of said cladding and the diameter of said core being selected such that the wavelength dependency $\partial \theta A / \partial \lambda$ [°/nm] of an angle $\theta A$ at which the wavelength-converted wave is emitted from the cladding exit end surface falls in the range:

$$-20 \times 10^{-4} \theta A < \frac{\partial \theta A}{\partial \lambda} < -1.2 \times 10^{-4} \theta A$$

where $\lambda$ is the wavelength of the wavelength-converted wave.

4. An optical wavelength converter system comprising:
   i) an optical fiber including a cladding having a first refractive index, and a core of a nonlinear optical material disposed in said cladding and having a second refractive index higher than said first refractive index, whereby said optical fiber converts the wavelength of a fundamental wave introduced into said core and radiates a wavelength-converted wave into said cladding, said cladding having an exit end surface for emitting the wavelength-converted wave; and ii) a reflective optical device for converting the wavefront of the wavelength-converted wave from a conical wavefront into a planar wavefront, said reflective optical device having a central axis aligned with the center of said core of the optical fiber, said reflective optical device also having a first conical refection surface for reflecting the wavelength-converted wave emitted from the cladding exit end surface of the optical fiber, toward said central axis, and a second conical reflecting surface for reflecting the wavelength-converted wave, which has been reflected by said first reflecting surface, in a direction away from the optical fiber.

5. An optical wavelength converter system comprising:

i) an optical fiber including a cladding having a first refractive index, and a core of a nonlinear optical material disposed in said cladding and having a second refractive index higher than said first refractive index, whereby said optical fiber converts the wavelength of a fundamental wave introduced into said core and radiates a wavelength-converted wave into said cladding, said cladding having an exit end surface for emitting the wavelength-converted wave; and ii) a reflective optical device for converting the wavefront of the wavelength-converted wave from a conical wavefront into a spherical wavefront, said reflective optical device having a central axis aligned with the center of said core of the optical fiber, said reflective optical device also having a first substantially conical reflecting surface for reflecting the wavelength-converted wave emitted from the cladding exit end surface of the optical fiber, toward said central axis, and a second substantially conical reflecting surface for reflecting the wavelength-converted wave, which has been reflected by said first reflecting surface, in a direction away from the optical fiber, at least one of said reflecting surfaces having a curvature.

6. An optical wavelength converter system according to claim 4 or 5, wherein the material of said cladding and the diameter of said core are selected such that the absolute value $|\partial\theta A/\partial\lambda|$ of the wavelength dependency of the angle $\theta A$ at which the wavelength-converted wave is emitted from the cladding exit end surface is smaller than $\sin^{-1}(\lambda/2D)$ where $\lambda$ is the wavelength of the wavelength-converted wave, and D is the effective diameter of the wavelength-converted wave.

7. An optical wavelength converter system comprising:

i) an optical fiber including a cladding having a first refractive index, and a core of a nonlinear optical material disposed in said cladding and having a second refractive index higher than said first refractive index, whereby said optical fiber converts the wavelength of a fundamental wave introduced into said core and radiates a wavelength-converted wave into said cladding, said cladding having an exit end surface for emitting the wavelength-converted wave;

ii) refractive and diffractive optical devices positioned to receive the wavelength-converted wave emitted from the cladding exit end surface of said optical fiber, for respectively refracting and diffracting the wavelength-converted wave to convert the conical wavefront thereof refractively and diffractively into a planar or spherical wavefront; and iii) said optical devices being separate from said optical fiber, and arranged to satisfy the equation:

$$\frac{\partial \theta A}{\partial \lambda} + \frac{\partial \theta t}{\partial \lambda} \simeq 0$$

where $\partial\theta t/\partial\lambda$ is the wavelength dependency of the total angle $\theta t$ at which the wavelength-converted wave is deflected by the optical devices, and $\partial\theta A/\partial\lambda$ is the wavelength dependency of the angle $\theta A$ at which the wavelength-converted wave is emitted from the cladding exit end surface.

8. An optical wavelength converter system comprising:

i) an optical fiber including a cladding having a first refractive index, and a core of a nonlinear optical material disposed in said cladding and having a second refractive index higher than said first refractive index, whereby said optical fiber converts the wavelength of a fundamental wave introduced into said core and radiates a wavelength-converted wave into said cladding, said cladding having an exit end surface for emitting the wavelength-converted wave;

ii) refractive and diffractive optical devices positioned to receive the wavelength-converted wave emitted from the cladding exit end surface of said optical fiber, for respectively refracting and diffracting the wavelength-converted wave to convert the conical wavefront thereof refractively and diffractively into a planar or spherical wavefront, and iii) one of said optical devices being formed directly on the cladding exit end surface, and arranged to satisfy the equation:

$$n\frac{\partial \theta o}{\partial \lambda} + \frac{\partial \theta t}{\partial \lambda} \simeq 0$$

where $\partial\theta t/\partial\lambda$ is the wavelength dependency of the total angle $\theta t$ at which the wavelength-converted wave is deflected by the optical devices, n is the refractive index of the cladding, $\theta o$ is the phase matching angle, and $\partial\theta o/\partial\lambda$ is the wavelength dependency of the phase matching angle $\theta o$.

* * * * *